(12) United States Patent
Liu et al.

(10) Patent No.: US 9,153,353 B2
(45) Date of Patent: Oct. 6, 2015

(54) ELECTRONICALLY CONDUCTIVE POLYMER BINDER FOR LITHIUM-ION BATTERY ELECTRODE

(71) Applicant: The Regents of the University of California, Oakland, CA (US)

(72) Inventors: Gao Liu, Piedmont, CA (US); Vincent S. Battaglia, San Anselmo, CA (US); Sang-Jae Park, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 52 days.

(21) Appl. No.: 13/842,161

(22) Filed: Mar. 15, 2013

(65) Prior Publication Data

US 2013/0288126 A1      Oct. 31, 2013

Related U.S. Application Data

(63) Continuation-in-part of application No. 13/294,885, filed on Nov. 11, 2011, now Pat. No. 8,852,461, which is a continuation-in-part of application No. PCT/US2010/035120, filed on May 17, 2010.

(60) Provisional application No. 61/179,258, filed on May 18, 2009, provisional application No. 61/243,076, filed on Sep. 16, 2009.

(51) Int. Cl.
*H01B 1/22* (2006.01)
*H01B 1/24* (2006.01)
(Continued)

(52) U.S. Cl.
CPC . *H01B 1/12* (2013.01); *B82Y 30/00* (2013.01); *C08G 61/02* (2013.01); *C08J 5/005* (2013.01); *C08K 3/08* (2013.01); *H01B 1/22* (2013.01); *H01B 1/24* (2013.01); *H01M 4/134* (2013.01); *H01M 4/1395* (2013.01); *H01M 4/386* (2013.01); *H01M 4/622* (2013.01); *H01M 4/624* (2013.01); *C08G 2261/1412* (2013.01);
(Continued)

(58) Field of Classification Search
CPC .............. H01B 1/00; H01B 1/12; H01B 1/22; H01B 1/24; H01L 51/0043; H01M 4/8647; H01M 4/8668
See application file for complete search history.

(56) References Cited

U.S. PATENT DOCUMENTS 5,424,372 A * 6/1995 Finter et al. ................... 525/423
6,565,763 B1 * 5/2003 Asakawa et al. ............... 216/56

OTHER PUBLICATIONS

Petrov et al "Noncovalent functionalization of multi-walled carbon nanotubes by pyrene containing polymers", Chem. Commun., 2003, 2904-2905.*

(Continued)

*Primary Examiner* — Mark Kopec
(74) *Attorney, Agent, or Firm* — Lawrence Berkeley National Laboratory

(57) ABSTRACT

A family of carboxylic acid groups containing fluorene/fluorenon copolymers is disclosed as binders of silicon particles in the fabrication of negative electrodes for use with lithium ion batteries. Triethyleneoxide side chains provide improved adhesion to materials such as, graphite, silicon, silicon alloy, tin, tin alloy. These binders enable the use of silicon as an electrode material as they significantly improve the cycleability of silicon by preventing electrode degradation over time. In particular, these polymers, which become conductive on first charge, bind to the silicon particles of the electrode, are flexible so as to better accommodate the expansion and contraction of the electrode during charge/discharge, and being conductive promote the flow battery current.

3 Claims, 21 Drawing Sheets

(a)

(b)

(c)

(51) Int. Cl.
*H01M 4/00* (2006.01)
*H01B 1/12* (2006.01)
*H01M 4/62* (2006.01)
*B82Y 30/00* (2011.01)
*C08J 5/00* (2006.01)
*C08G 61/02* (2006.01)
*C08K 3/08* (2006.01)
*H01M 4/134* (2010.01)
*H01M 4/1395* (2010.01)
*H01M 4/38* (2006.01)
*H01M 10/0525* (2010.01)
*H01M 4/36* (2006.01)
*H01M 4/587* (2010.01)

(52) U.S. Cl.
CPC .. *C08G2261/312* (2013.01); *C08G 2261/3142* (2013.01); *C08G 2261/411* (2013.01); *C08G 2261/516* (2013.01); *C08J 2365/00* (2013.01); *H01M 4/364* (2013.01); *H01M 4/387* (2013.01); *H01M 4/587* (2013.01); *H01M 10/0525* (2013.01); *Y02E 60/122* (2013.01)

(56) References Cited

OTHER PUBLICATIONS

Pietsch et al "PMMA based soluble polymeric temperature sensors . . . ", Polym. Chem., 2010, 1, 1005-1008.*

* cited by examiner (a)

(b)

(c)

(a)

(b)

(c)

(a)

(b)

(c)

ELECTRONICALLY CONDUCTIVE POLYMER BINDER FOR LITHIUM-ION BATTERY ELECTRODE

CROSS REFERENCE TO RELATED APPLICATIONS

This application is a continuation-in-part of U.S. application Ser. No. 13/294,885, filed Nov. 11, 2011, now U.S. Pat. No. 8,852,461, and entitled Electronically Conductive Polymer Binder for Lithium-Ion Battery Electrode; which is a continuation of PCT Application No. PCT/US2010/035120, filed May 17, 2010 and entitled Electronically Conductive Polymer Binder for Lithium-Ion Battery Electrode; which claims priority to U.S. Provisional Application Ser. No. 61/179,258 filed May 18, 2009, and U.S. Provisional Application Ser. No. 61/243,076 filed Sep. 16, 2009, both entitled Electronically Conductive Polymer Binder for Lithium-ion Battery Electrode, Liu et al. inventors, each of which applications is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231. The government has certain rights in this invention.

BACKGROUND OF THE INVENTION

1. Field of the Invention

This invention relates generally to lithium ion batteries, and more specifically to an improved polymeric binder for forming silicon electrodes resulting in battery electrodes of increased charge density.

2. Background of the Invention

Lithium-ion batteries are a type of rechargeable battery in which lithium ions move between the negative and positive electrode. The lithium ion moves through an electrolyte from the negative to the positive during discharge, and in reverse, from the positive to the negative, during recharge. Most commonly the negative electrode is made of graphite, which material is particularly preferred due to its stability during charge and discharge cycles as it forms solid electrolyte interface (SEI) layers with very small volume change.

Lithium ion batteries and finding ever increasing acceptance as power sources for portable electronics such as mobile phones and laptop computers that require high energy density and long lifetime. Such batteries are also finding application as power sources for automobiles, where recharge cycle capability and energy density are key requirements. In this regard, research is being conducted in the area of improved electrolytes, and improved electrodes. High-capacity electrodes for lithium-ion batteries have yet to be developed in order to meet the 40-mile plug-in hybrid electric vehicle energy density needs that are currently targeted.

One approach is to replace graphite as the negative electrode with silicon. Notably graphite electrodes are rated at 372 mAh/g (milliamp hours per gram) at $LiC_6$, while silicon electrodes are rated more than tenfold better at 4,200 mAh/g at $Li_{4.4}Si$. However, numerous issues prevent this material from being used as a negative electrode material in lithium-ion batteries. Full capacity cycling of Si results in significant capacity fade due to a large volume change during Li insertion (lithiation) and removal (de-lithiation). This volumetric change during reasonable cycling rates induces significant amounts of stress in micron size particles, causing the particles to fracture. Thus an electrode made with micron-size Si particles has to be cycled in a limited voltage range to minimize volume change.

Decreasing the particle size to nanometer scale can be an effective means of accommodating the volume change. However, the repeated volume change during cycling can also lead to repositioning of the particles in the electrode matrix and result in particle dislocation from the conductive matrix. This dislocation of particles causes the rapid fade of the electrode capacity during cycling, even though the Si particles are not fractured. Novel nano-fabrication strategies have been used to address some of the issues seen in the Si electrode, with some degree of success. However, these processes incur significantly higher manufacturing costs, as some of the approaches are not compatible with current Li ion manufacture technology. Thus, there remains the need for a simple, efficient and cost effective means for improving the stability and cycle-ability of silicon electrodes for use in Lithium ion batteries.

SUMMARY OF INVENTION

By way of this invention, a new class of binder materials has been designed and synthesized to be used in the fabrication of silicon containing electrodes. These new binders, which become conductive on first charge, provide improved binding force to the Si surface to help maintain good electronic connectivity throughout the electrode, to thus promote the flow of current through the electrode. The electrodes made with these binders have significantly improved the cycling capability of Si, due in part to their elasticity and ability to bind with the silicon particles used in the fabrication of the electrode.

More particularly, we have found that a novel class of conductive polymers can be used as conductive binders for the anode electrode. These polymers include poly 9,9-dioctylfluorene and 9-fluorenone copolymer. The polyfluorene polymer can be reduced around 1.0 V (vs. lithium metal potential) and becomes very conductive from 0-1.0 V. Since negative electrodes (such as Si) operate within a 0-1.0 V window, this allows polyfluorene to be used as an anode binder in the lithium ion battery to provide both mechanical binding and electric pathways. As a unique feature of this polymer, by modifying the side chain of the polyfluorene conductive polymer with functional groups such as —COOH that will bond with Si nanocrystals, significantly improved adhesion can be realized.

BRIEF DESCRIPTION OF THE DRAWINGS

The foregoing aspects and others will be readily appreciated by the skilled artisan from the following description of illustrative embodiments when read in conjunction with the accompanying drawings.

FIG. 12(a) illustrates electrode performance of Ant (5%):Si (95%) (0.31 mg/cm2) (Cycling rate: C/10). FIG. 12(b) illustrates electrode performance of Ant (10%):Si (90%) (0.42 mg/cm2) (Cycling rate: C/10). FIG. 12(c) illustrates FIG. 13 illustrates electrode performance based on cycling at C/10 rate at 1V to 0.01 V voltage window of Pyr (33%):Si (67%) (0.24 mg/cm2) (Cycling rate C/10).

FIG. 14(a) illustrates electrode performance of Ant0.7-co-TEG0.3 (33%):Si (67%) (0.34 mg/cm2) (Cycling rate: C/10). FIG. 14(b) illustrates electrode performance of Ant0.7-co-TEG0.3 (33%):Si (67%) (0.77 mg/cm2) (Cycling rate: C/10).

FIG. 15(a) illustrates electrode performance of Pyr0.7-co-TEG0.3(%): Si (95%)(0.11 mg/cm2) (C/10). FIG. 15(b) illustrates electrode performance of Pyr0.7-co-TEG0.3 (33%):Si (67%)(0.22 mg/cm2) (C/10). FIG. 15(c) illustrates the electrode appearance.

FIG. 16(a) illustrates polymethacrylate backbone structure of the conductive polymer binder. FIG. 16(b) illustrates polyacrylate ester backbone structure of the conductive polymer binder. FIG. 16(c) illustrates polyvinylalcohol ether backbone structure of the conductive polymer binder.

DETAILED DESCRIPTION

Figure 1:
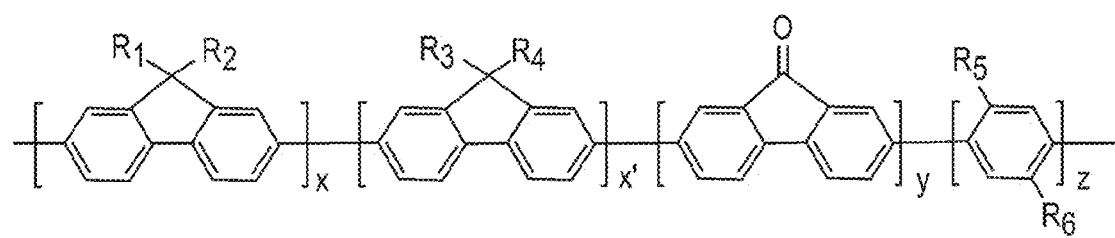
FIG. 1 depicts a generic chemical formula of a conductive polymer binder according to an embodiment of the present invention.

According to this invention the conductive polymers developed herein act as a binder for the silicon particles used for the construction of the negative anode. They are mixed with the silicon nano sized silicon parties in a slurry process, then coated on a substrate such as copper or aluminum and thereafter allowed to dry to form the film electrode. Though the silicon particles can range from micron to nano size, the use of nano sized particles is preferred as such results in an electrode material that can better accommodate volume changes.

A fabrication method for the synthesis of one embodiment of the binder polymer of this invention is as set forth below. First presented is a means for preparing one of the monomers used in polymer formation, i.e. 2,5-dibromo-1,4-benzenedicarboxylic acid, a reaction scheme for preparing this monomer illustrated at paragraph [0020], immediately below.

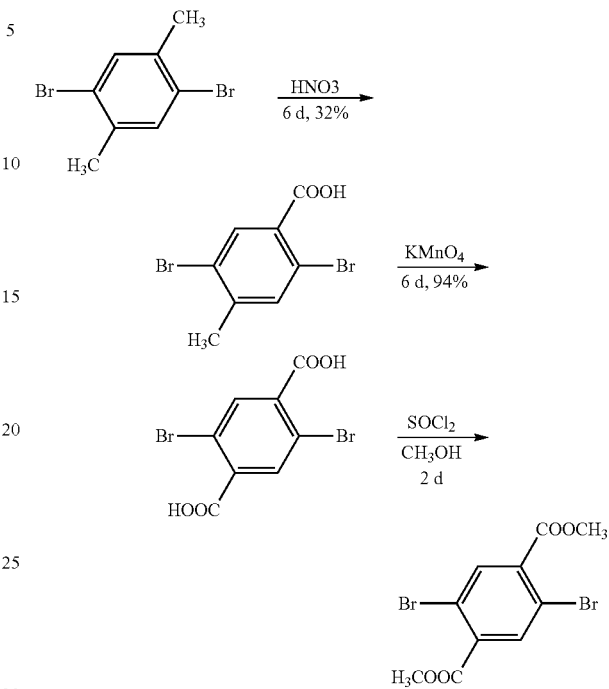

When the benzenedicarboxylic acid staring material has only one $CH_3$ group, the reaction will end up with only one R=$COOCH_3$ group in the final product.

A. Synthesis of polymeric PFFO
(poly(9,9-dioctylfluorene-co-fluorenone))

Exemplary of a method for forming one of the polymers of this invention is provided with respect to one embodiment, according to the reaction scheme set forth at paragraph [0023], below. A mixture of 9,9-dioctylfluorene-2,7-diboronic acid bis(1,3-propanediol) ester (0.83 g, 1.5 mmol) commercially available from Sigma-Aldrich Company, 2,7-dibromo-9-fluorenone (0.50 g, 1.5 mmol), $(PPh_3)_4Pd(0)$ (0.085 g, 0.07 mmol) and several drops of aliquat 336 in a mixture of 10 mL of THF (tetrahydrofuran) and 4.5 mL of 2 M $Na_2CO_3$ solution was refluxed with vigorous stiffing for 72 hours under an argon atmosphere. During the polymerization, a brownish solid precipitated out of solution. The solid was collected and purified by Soxhlet extraction with acetone as solvent for two days with a yield of 86%.

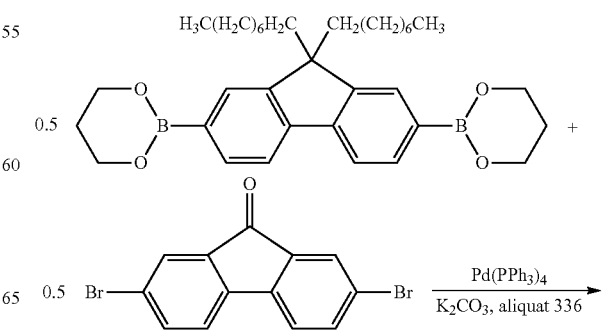

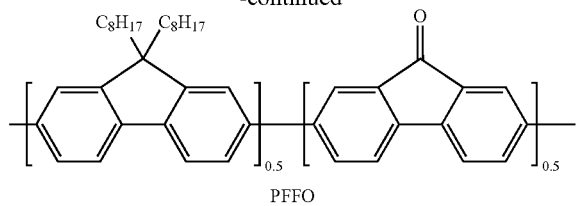

PFFO

B. Synthesis of PFFOMB (poly(9,9-dioctylfluorene-co-fluorenone-co-methylbenzoic acid))

A mixture of 9,9-dioctylfluorene-2,7-diboronic acid bis(1,3-propanediol) ester (0.80 g, 1.43 mmol), 2,7-dibromo-9-fluorenone (0.24 g, 0.72 mmol), methyl 2,5-dibromobenzoate (0.21 g, 0.72 mmol), $(PPh_3)_4Pd(0)$ (0.082 g, 0.072 mmol) and several drops of Aliquat 336 in a mixture of 13 mL of THF (tetrahydrofuran) and 5 mL of 2 M $Na_2CO_3$ solution was refluxed with vigorous stirring for 72 h under an argon atmosphere. After reaction stopped, the solution was concentrated by vacuum evaporation and the polymer was precipitated from methanol. The resulting polymer was further purified by precipitating from methanol twice. The final polymer was collected by suction filtration and dried under vacuum with a yield of 87%.

C. Synthesis of PFFOBA (poly(9,9-dioctylfluorene-co-fluorenone-co-benzoic acid))

A mixture of PFFOMB (0.36 g) and KOH (2 g, 35 mmol) in 20 mL of THF and 2 mL of $H_2O$ was refluxed for 48 h under an argon atmosphere. After reaction stopped, the solution was concentrated by vacuum evaporation and polymer was precipitated from methanol. The resulting polymer was suspended in 10 mL of concentrated $H_2SO_4$ with vigorous stiffing for 12 hours. The final product was filtered, washed with water and dried with a yield of 96%.

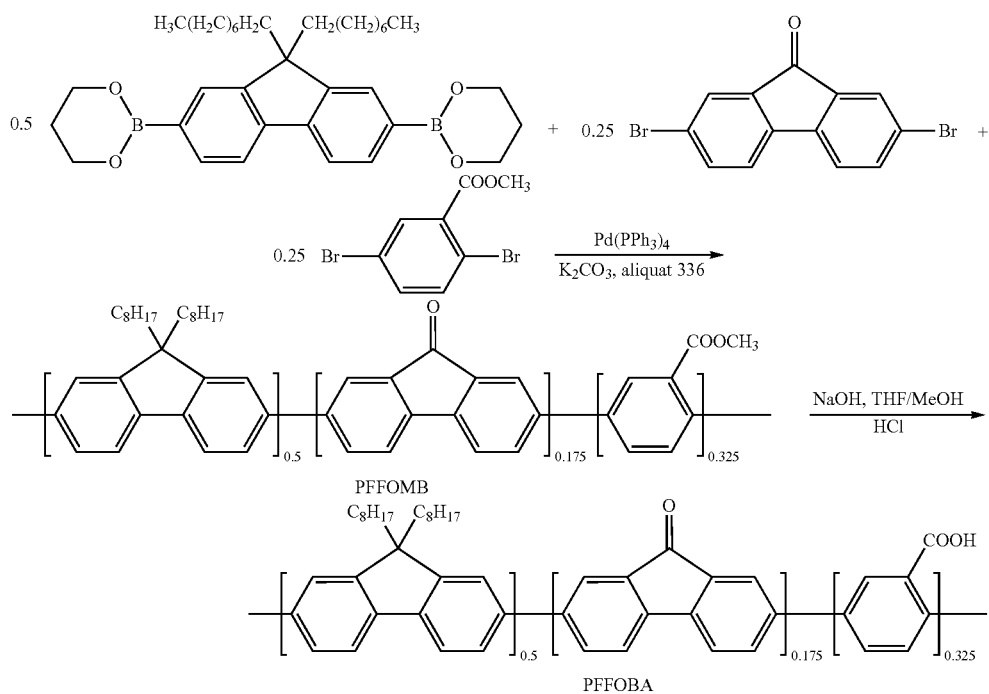

Reaction scheme for forming conductive polymer with —$COOCH_3$ (PFFOMB) and —COOH(PFFOBA) groups on the side chains.

It has been found that the presence of —COOH groups serves to increase the bindability of the polymer to the silicon particles of the electrode. In particular, one can position carboxylic acid groups in connection with the $9^{th}$ position of fluorene backbone. The below formula depicts the general structure of this type of polymer.

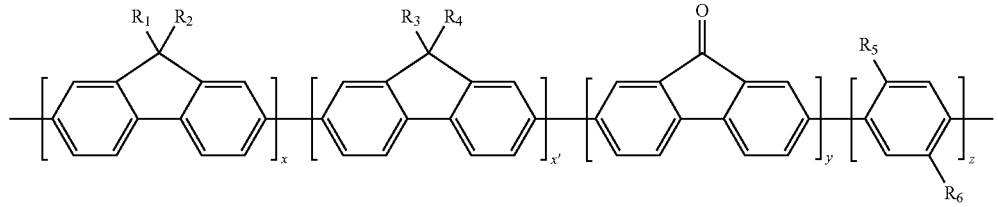

Wherein x=0, x' and y=>0, and z<=1, and x'+y+z=1, $R_3$ and $R_4$ can be $(CH_2)_nCOOH$, n=0-8, and $R_5$ and $R_6$ can be any combination of H, COOH and $COOCH_3$.

Another variation is to adjust the number of COOH groups by copolymerizing x monomer into the main chains as illustrated in the formula shown below. By adjusting the ratio of x:x', the number of —COOH groups can be controlled without changing the electronic properties of the conductive binders. Exemplary of such a composition is as illustrated below by the following formula.

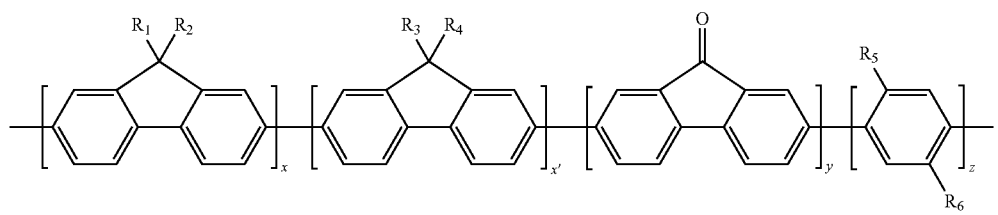

PFF'FOB

Herein, x, x', y>0, and z<=1, with x+x'+y+z=1. $R_1$ and $R_2$ can be $(CH_2)_nCH_3$, n=0-8. $R_3$ and $R_4$ can be $(CH_2)_nCOOH$, n=0-8. $R_5$ and $R_6$ can be any combination of H, COOH and $COOCH_3$; and the "x, x'" unit is fluorene with either alkyl or alkylcarboxylic acid at the 9,9' positions; the "y" unit is fluorenone, The H positions of the back bone of fluorenon and fluorene also can be substituted with functional groups such as COOH, F, Cl, Br, $SO_3H$, etc.

In still another embodiment, one can increase the flexibility of the polymer by introducing a flexible section between repeating units. This is illustrated as shown below where a flexible chain section such as alkyl or polyethylene can be used to connect A sections together to further improve elasticity, the structure illustrated by the below formula:

where n>=0, and the A sections are defined as follows:

cally introduce flexible units (n) into the polymer system as show above. Unit n is a flexible alkyl or polyethylene portion. This flexible unit (n) can be one or many of —$CH_2$ units depending upon the requirements for a particular alloy system, or could be other types of liner units depending on the ease of synthesis. Both x, x', y and z units could be one or many fluorene or fluorenone units. One possible structure is of a random copolymer with a few percent of flexible units distributed along the fluorene main chain. The $R_1$-$R_6$ units could be either one of the choices, and it is not necessary they be all the same in a polymer chain. Increasing the length of the side chains may also have an effect on the flexibility of the polymer binder. Therefore, the number of units in $R_1$-$R_6$ is also subject to change during an optimization process. One may change the number of units of the $R_1$-$R_6$, and look for improved cell cycling performance as indication of optimization.

Another issue is the stability and impedance of the interface between the active cathode material and electrolyte. The binder may cover (that is, over-coat) all the active materials at higher binder loadings. Such over-coverage will modify the interface stability and impedance. Varying the number of units in $R_1$-$R_6$ will play a significant role in optimizing the charge transfer impedance at the interface.

Current polymer structures that have been synthesized and tested in lithium ion battery are shown as illustrated by the below.

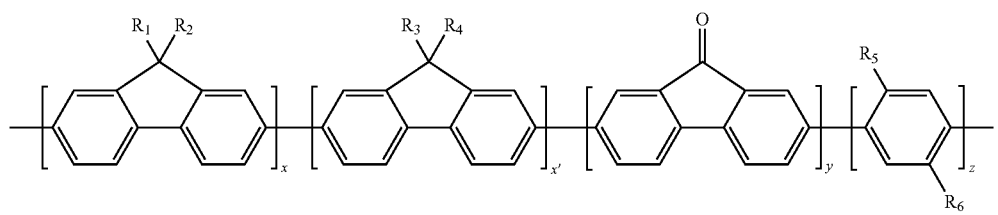

PFF'FOB

Wherein
0<=x, x', y and z<=1 and x+x'+y+z=1.
$R_1$ and $R_2$ can be $(CH_2)_nCH_3$, n=0-8, $R_3$ and $R_4$ can be $(CH_2)_n$ COOH, n=0-8, $R_5$ and $R_6$ can be any combination of H, COOH and $COOCH_3$.

Most of the highly conjugated conductive polymers have rigid backbones, and the elasticity of the polymers is low. In order to accommodate volume expansion incurred during the Li interacalation and de-intercalation in the alloys, it is important that the conductive polymer binders have certain degree of elasticity. One method to increase flexibility is to syntheti- PFFO (poly(9,9-dioctylfluorene-co-fluorenone))

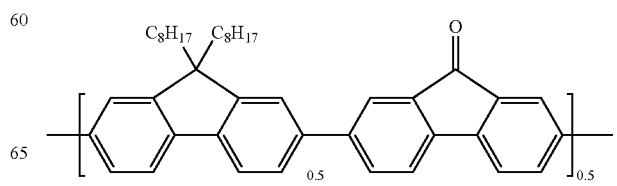

PFFOMB (poly(9,9-dioctylfluorene-co-fluorenone-co-methylbenzoic acid))

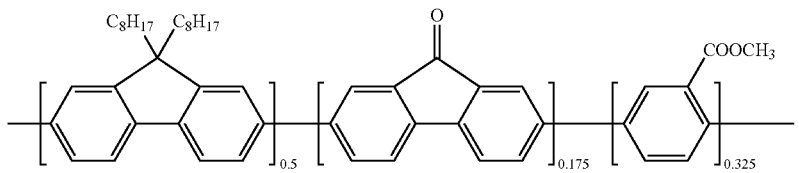

PFFOBA
(poly(9,9-dioctylfluorene-co-fluorenone-co-benzoic acid))

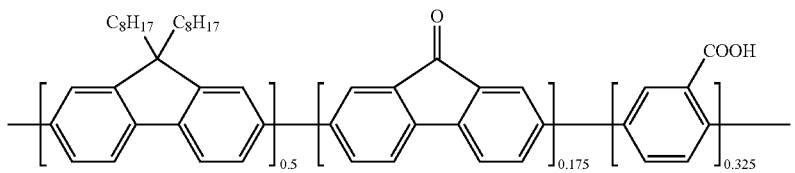

Once the conductive polymers have been synthesized they can be mixed with the silicon particles, and coated onto a substrate such as copper and allowed to dry to form the electrode material. A more detailed discussion of electrode preparation is presented below. An advantage of the use of these conductive polymers of the present invention is that they are easily compatible with current slurry processes for making electrodes, thus requiring no special steps or equipment.

Process for Making Slurry of Conductive Polymer

Si/conductive polymer mixtures were made by dissolving 0.09 g of the conductive polymer of FIG. 1 (i.e., PFFOBA, wherein $R_1=R_2=(CH_2)_7CH_3$, $R_5=COOCH_3$, $R_6=H$, and x=0.5, x'=0, y=0.175 and z=0.325)) in 2.6 g of chlorobenzene. 0.18 g of Si was dispersed in the polymer solution to meet the desired Si: polymer ratios at 2:1. To ensure the thorough mixing of the Si nanoparticles into the polymer solution, a Branson 450 sonicator equipped with a solid horn was used. The sonication power was set at 70%. A continuous sequence of 10 second pulses followed by 30 second rests was used. The sonic dispersion process took about 30 min. All of the mixing processes were performed in Ar-filled glove boxes.

Process for Making Conductive Glue of AB/PVDF

Figure 2:
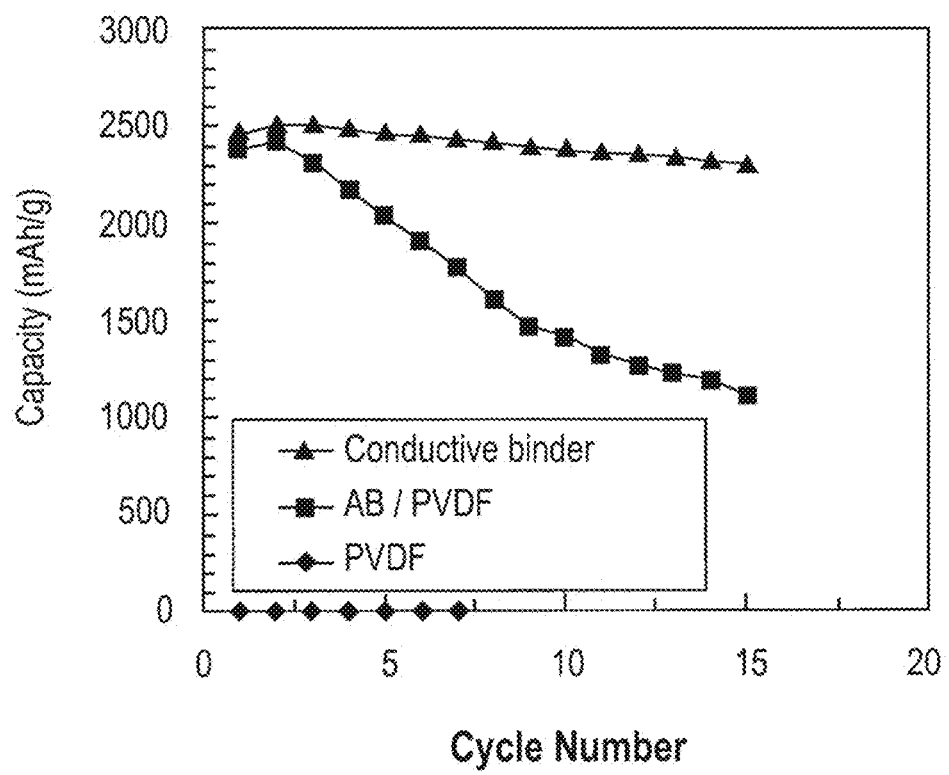
FIG. 2 is a plot of electrode capacity vs. cycle number for a Si anode made with the conductive binder of FIG. 1 according to one embodiment of the invention, wherein $R_1=R_2=(CH_2)_7CH_3$, $R_5$=COOCH3, $R_6$=H and x=0.5, x'=0, y=0.175 and z=0.325.
Figure 3:
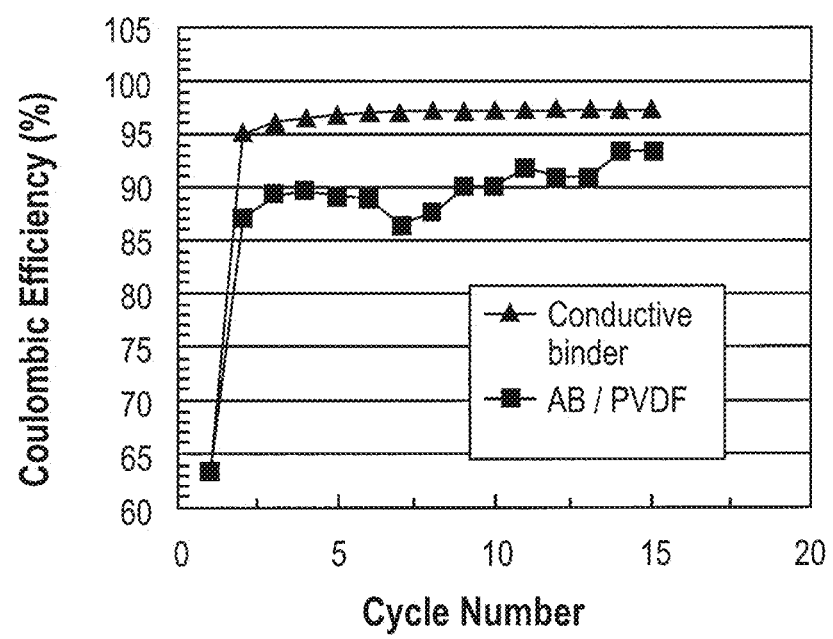
FIG. 3 is a plot of Coulombic Efficiency (%) vs. Cycle Number for the same Si anode/conductive binder electrode of FIG. 2.

By way of comparison to the conductive polymers of this invention, illustrated in FIGS. 2 and 3, slurries of AB: PVDF (acetylene black/polyvinylidene fluoride) at 0.2:1 ratios by weight were made by dissolving 5 g of PVDF in to 95 g of NMP to make a 5% PVDF in NMP solution. Proper amounts of AB was dispersed in the PVDF solution to meet the desired AB: PVDF ratios. To ensure the thorough mixing of the AB nanoparticles into the PVDF solution, the Branson 450 sonicator equipped with a solid horn was used. The sonication power was set at 70%. A continuous sequence of 10 s pulses followed by 30 s rests was used. The sonic dispersion process took ca. 30 min. All of the mixing processes were performed in Ar-filled glove boxes.

Process for Making Slurry of Si/AB/PVDF 0.86 g Si was mixed with 7.16 g of the conductive glue (PVDF:AB=1:0.2 by weight in 95% PVDF NMP solution). To ensure the thorough mixing of the Si nanoparticles into the glue solution, the Branson 450 sonicator equipped with a solid horn was used. The sonication power was set at 70%. A continuous sequence of 10 s pulses followed by 30 s rests was used. The sonic dispersion process took about 30 min. All of the mixing processes were performed in Ar-filled glove boxes.

Process for Making the Electrode

All electrode laminates were cast onto a 20 µm thick battery-grade Cu sheet using a Mitutoyo doctor blade and a Yoshimitsu Seiki vacuum drawdown coater to roughly the same loading per unit area of active material. The films and laminates were first dried under infrared lamps for 1 h until most of the solvent was evaporated and they appeared dried. The films and laminates were further dried at 120° C. under $10^{-2}$ Torr dynamic vacuum for 24 h. The film and laminate thicknesses were measured with a Mitutoyo micrometer with an accuracy of ±1 µm. The typical thickness of film is about 20 µm. The electrodes were compressed to 35% porosity before coin cell assembly using a calender machine from International Rolling Mill equipped with a continuously adjustable gap.

Process for Fabricating Coin Cell

Coin cell assembly was performed using standard 2325 coin cell hardware. A 1.47 cm diameter disk was punched out from the laminate for use in the coin cell assembly as a working electrode. Lithium foil was used in making the counter electrode. The counter electrodes were cut to 1.5 cm diameter disks. The working electrode was placed in the center of the outer shell of the coin cell assembly and two drops of 1 M $LiPF_6$ in EC:DEC (1:1 weight ratio) electrolyte purchased from Ferro Inc. were added to wet the electrode. A 2 cm diameter of Celgard 2400 porous polyethylene separator was placed on top of the working electrode. Three more drops of the electrolyte were added to the separator. The counter electrode was placed on the top of the separator. Special care was taken to align the counter electrode symmetrically above the working electrode. A stainless steel spacer and a Belleville spring were placed on top of the counter electrode. A plastic grommet was placed on top of the outer edge of the electrode assembly and crimp closed with a custom-built crimping machine manufactured by National Research Council of Canada. The entire cell fabrication procedure was done in an Ar-atmosphere glove box.

Process for Testing Coin Cell

The coin cell performance was evaluated in a thermal chamber at 30° C. with a Maccor Series 4000 Battery Test System. The cycling voltage limits were set at 1.0 V at the top of the charge and 0.01 V at the end of the discharge.

Chemicals

All the starting chemical materials for synthesis of the conductive polymer were purchased from Sigma-Aldrich. Battery-grade AB with an average particle size of 40 nm, a specific surface area of 60.4 m²/g, and a material density of 1.95 g/cm³ was acquired from Denka Singapore Private Ltd. PVDF KF1100 binder with a material density of 1.78 g/cm³ was supplied by Kureha, Japan. Anhydrous N-methylpyrrolidone NMP with 50 ppm of water content was purchased from Aldrich Chemical Co.

As described above, the conductive polymers of this invention can be used as electrically conductive binders for Si nanoparticles electrodes. The electron withdrawing units lowering the LUMO level of the conductive polymer make it prone to reduction around 1 V against a lithium reference, and the carboxylic acid groups provide covalent bonding with OH groups on the Si surface by forming ester bonds. The alkyls in the main chain provide flexibility for the binder.

Figure 4:
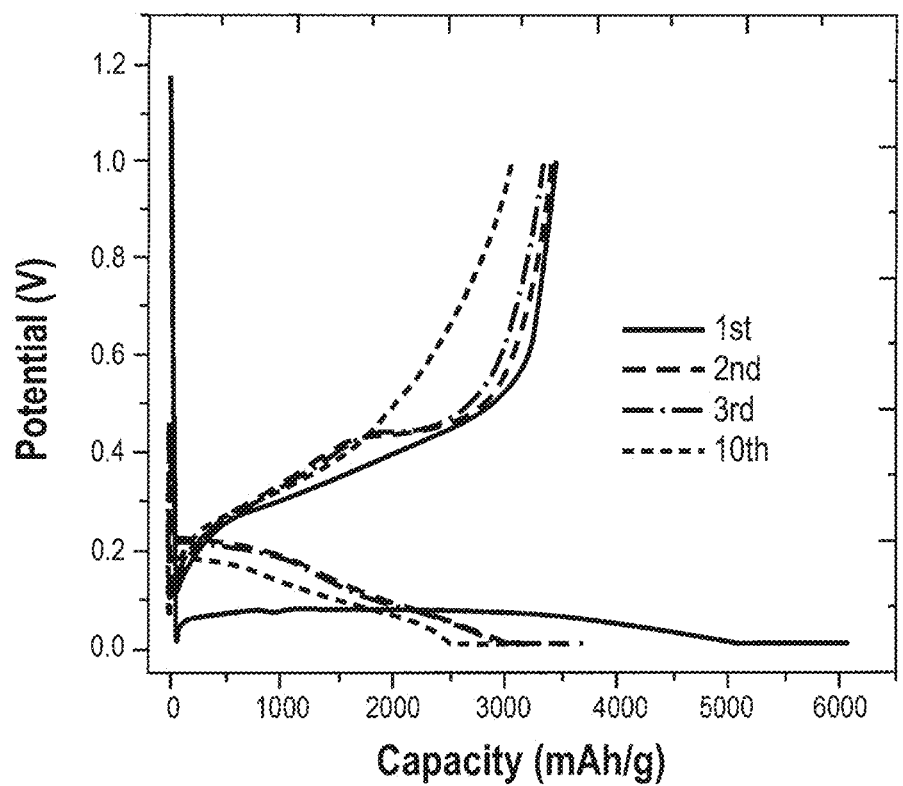
FIG. 4 shows the voltage profile of the electrode of FIG. 2 in the first several cycles of lithium insertion and removal.
Figure 5:
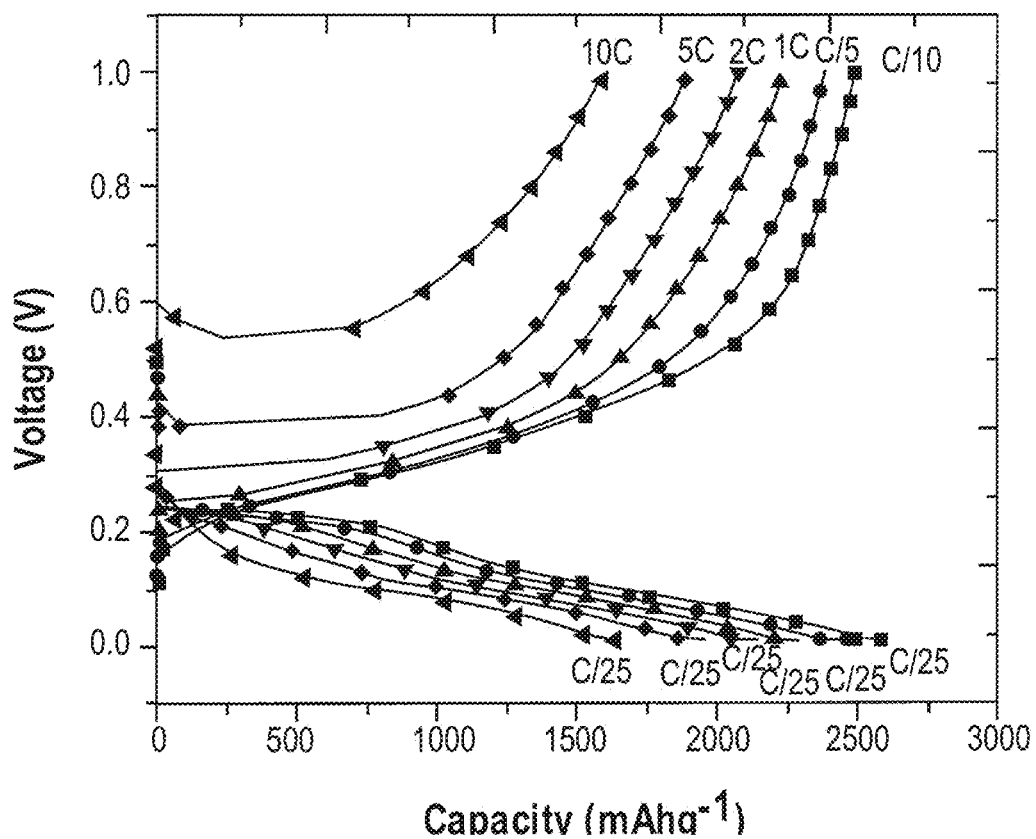
FIG. 5 shows the de-lithiation performance of the same electrode at different charge-rates.
Figure 6:
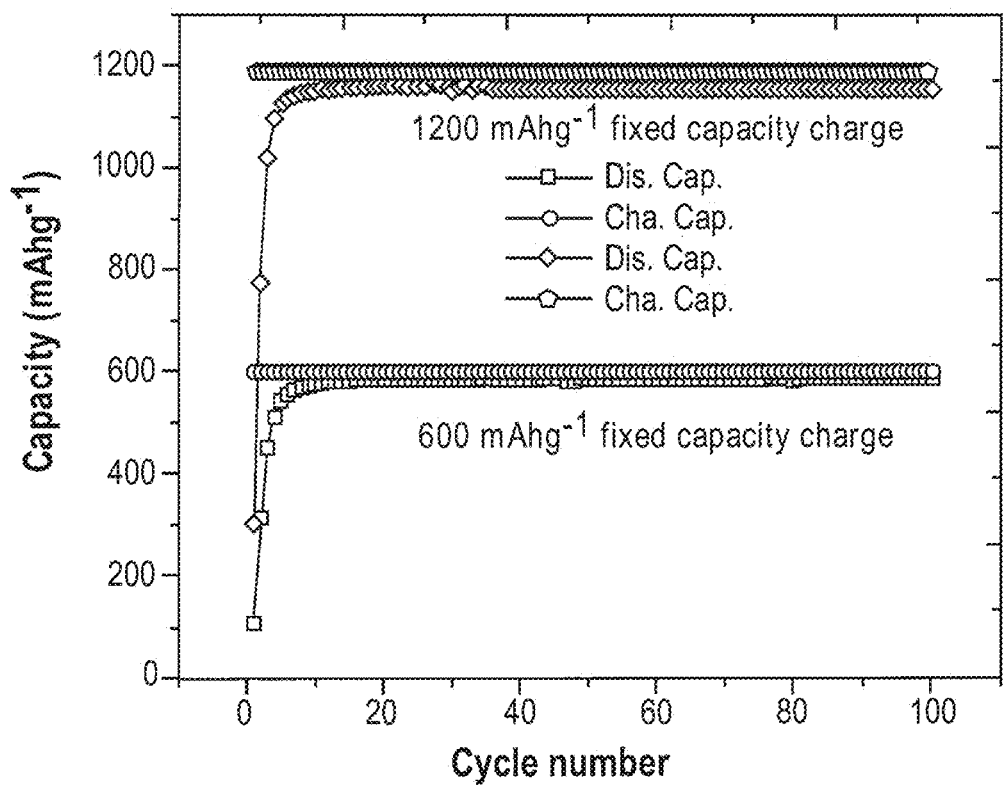
FIG. 6 is a plot of Si electrode cycling behavior at fixed capacity for the electrode of FIG. 2. When the lithiation is limited to a selected capacity, the de-lithiation capacities are stable in 100 cycles as shown.
Figure 7:
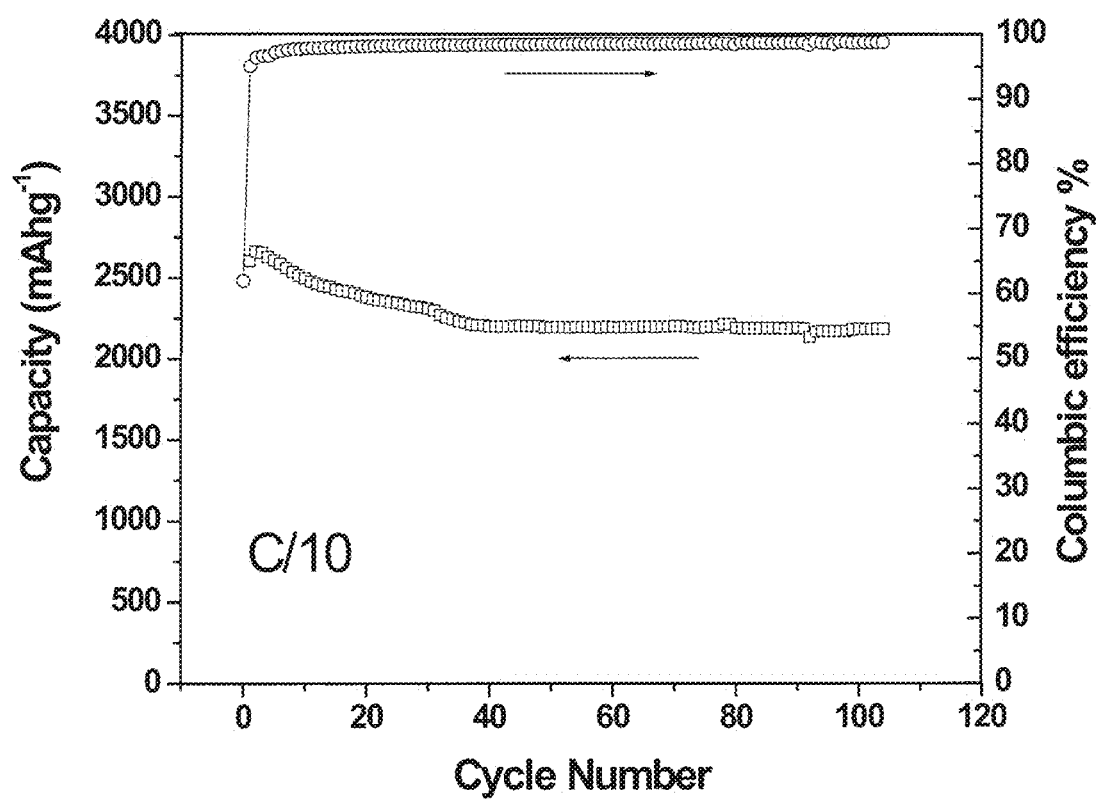
FIG. 7 is a plot of cycling results for a PFFOMB (poly(9, 9-dioctylfluorene-co-fluorenone-co-methylbenzoic acid)) binder used in combination with an electrolyte comprising $LiPF_6$ in EC/DEC+10% FEC.

Results of the various tests that were conducted are as reported in the various plots of FIGS. 2-6. FIG. 2 shows the new conductive polymer binder in combination with Si nanoparticles much improving the capacity retention compared to conventional acetylene black (AB) and polyvinylidene difluoride (PVDF) conductive additive and binder as a control. FIG. 3 illustrates the improved coulombic efficiency of the conductive binder/Si electrode of the invention compared with the conventional AB/PVDF approach. FIG. 4 illustrates results showing very similar voltage profiles of the conductive polymer/Si electrode to the pure Si film type of electrode. FIG. 5 plots the rate performance of the conductive polymer/Si electrode of the invention, showing good results. Evan at a 10 C rate, there is still more than half of the capacity retention. Finally, FIG. 6 illustrates cycleability of the silicon electrode made with the copolymer binder of the invention, which is very good at limited capacity range. There is no capacity fade in 100 cycles at 1200 mAh/g and 600 mAh/g fixed capacity cycling. FIG. 7 illustrates cycling results for a PFFOMB binder using an electrolyte comprising 1.2 M LiPF6 in EC/DEC (ethylene carbonate and diethylene carbonate) plus 10% FEC (fluoroethylene carbonate or fluorinated ethylene carbonate), the FEC additive serving as a stabilizer.

C. Synthesis of PFPFOFOMB (poly(2,7-9,9-dioctylfluorene-co-2,7-9,9-(di(oxy-2,5,8-trioxadecane))fluorine-co-2,7-fluorenone-co-2,5-1-methylbenzoic ester)) (an analog of PFFOMB) binder and the Si electrode performance Triethyleneoxide side chains provide improved adhesion to materials such as, graphite, silicon, silicon alloy, tin, tin alloy. Additionally triethyleneoxide side chains provide a higher swelling rate that improves ionic conduction. In one embodiment, a 30% weight increase above dry weight provides an increase in ionic conduction while also avoiding bursting of the battery.

Scheme 1. Monomer synthesis

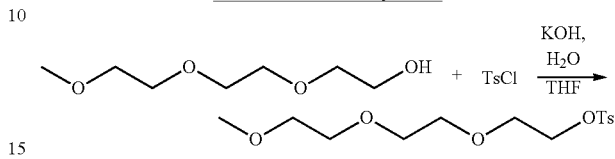

Scheme 2. Generic structure of monomer synthesis

Scheme 1 lists the synthetic process to form the tosylated triethyleneoxide methylether.

The number of ethyleneoxide units can vary from 0 to 10000 (n=0-10000), and n can be an exact number or an average. The higher number of n is called an oligoethyleneoxide monomethylether. Scheme 2 gives the generic structure of a possible family of the tosylate products. The typical number of n is from 1-5.

Scheme 3. Synthesis of the PFO monomer with triethyleneoxide side chains

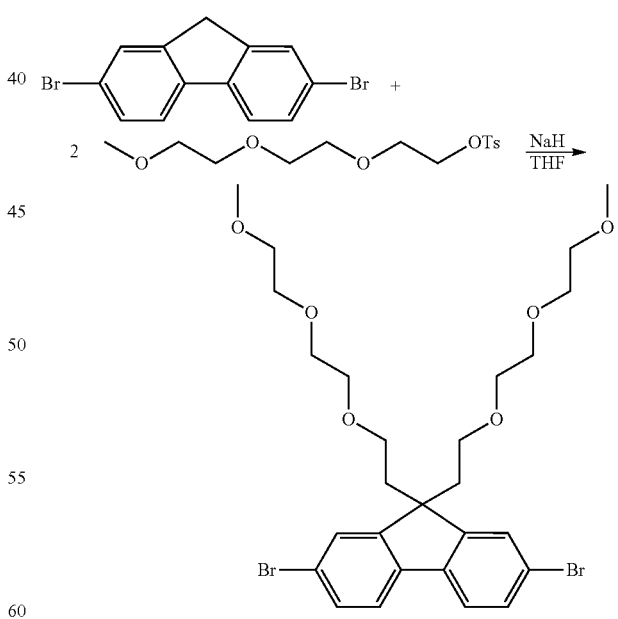

Scheme 3 is the schematic process of synthesis of the PFO monomer using tosylated triethlyeneoxide monomethylether. Tosylate with other oligothyleneoxide monomethylether as in Scheme 2 can also be used to form different lengths of ethyleneoxide chains at the 9 positions of the fluorene.

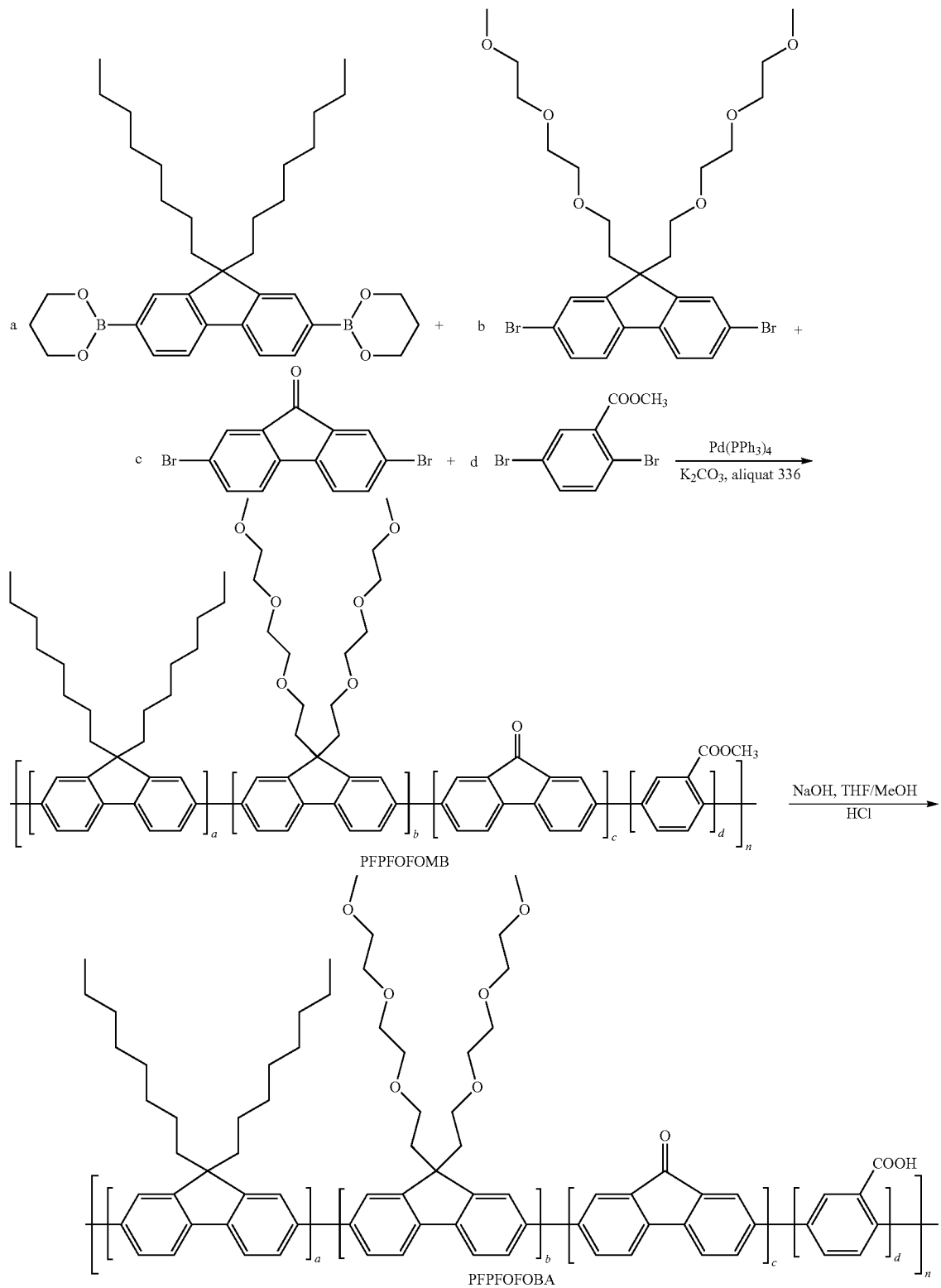

Scheme 4. Synthesis of PFPFOFOMB and PFPFOFOBA process

The PFO monomer can be incorporated into the PFFOMB polymer binder (IB-2643) in the process described in Scheme 4. Both PFPFOFOMB and PFPFOFOBA are random copolymers, where all the units are located randomly. The subscribed numbers in the polymer molecular structure indicates the ratios among all the units. This synthesis process requires to have a=b+c+d. The composition we used to generate the polymer PFPFOFOMA is a=3, b=1, c=1 and d=1, so the ratio between the Octylfluorene (segment a) and triethyleneoxide fluorene (segment b) is 3/1. The segment b has higher polarity due to the triethyleneoxide chains therefore increases electrolyte uptake and improved adhesion between the particle surfaces and the binder. With synthetic Scheme 4, a, b, c, and d can vary from 0-1000 as long as the condition of a=b+c+d is satisfied.

Scheme 5. An alternative synthesis process to make PFPFOFOMB and PFPFOFOBA

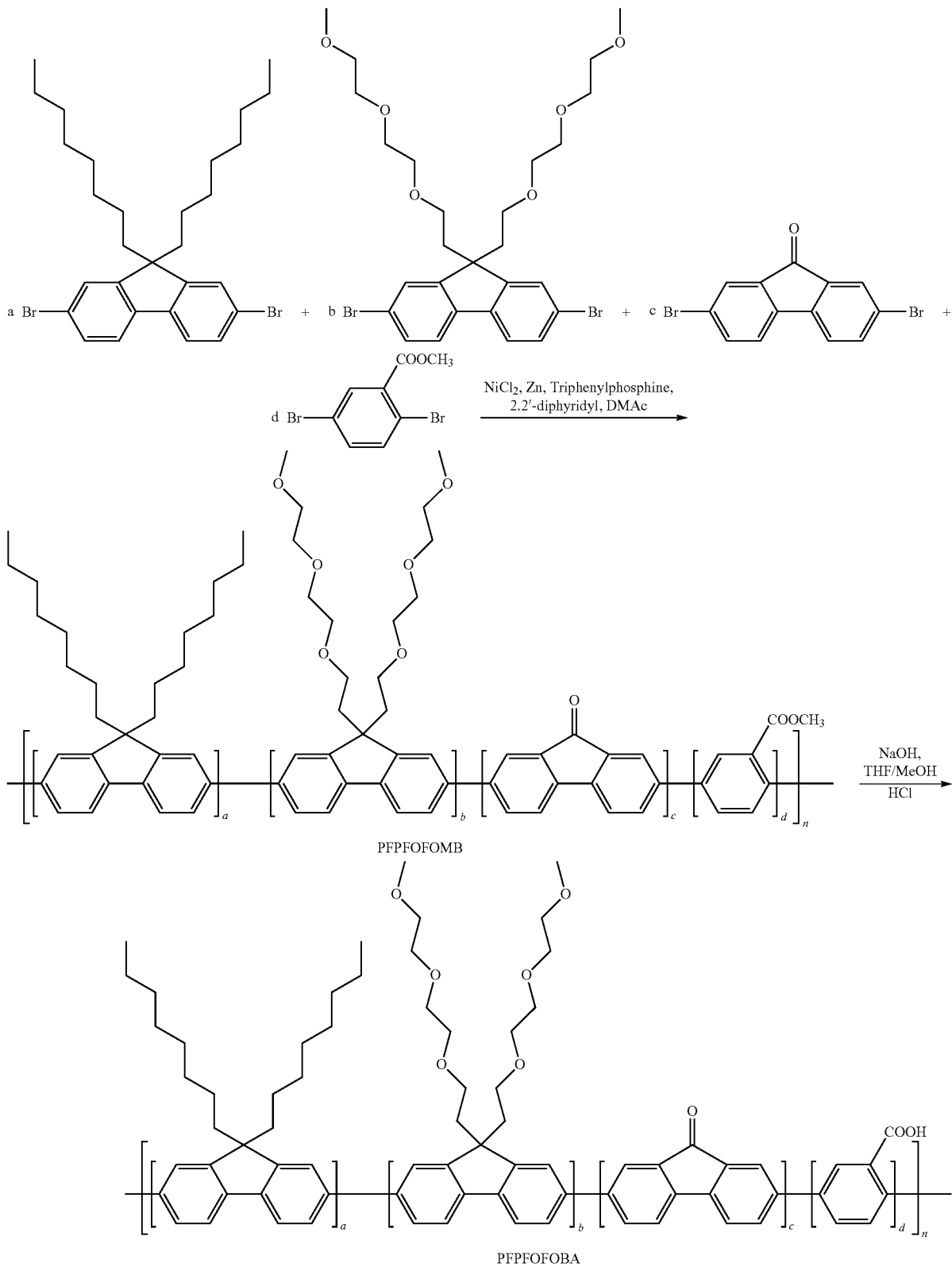

Scheme 5 is an alternative synthesis process to make both PFPFOFOMB and PFPFOFOBA polymers. This alternative process does not have the constraint as the process described in Scheme 4. Therefore, a, b, c, d can be another number between 0-1000. The alternation of the numbers has a major impact of the binder when combined with silicon.

The above binder is combined with Si (Sn or other alloy of the kind) particles to formulate a lithium ion negative electrode. The particle can be spherical, a wire, or a plate. For spherical or pseudo spherical particles, the diameter can be from 0.1 nm-100 micron. For wires, the spherical cross-section is in 0.1 nm-100 micron. The length is 1 nm-1000 micron. For a plate, the thickness is in 0.1 nm-100 micron. The plain size is also 0.1 nm-100 micron. The binder and particle composites contain at least one particle.

THF solution (30 mL). Sodium hydride (1.0 g, 40 mmol) was added to the THF solution at room temperature and refluxed for 5 hours. 10-Tosyloxy-2,5,8-trioxadecane (11.8 g, 37 mmol) in 20 mL of dry THF was added dropwise to the refluxed solution. The mixture was allowed to refluxed over night, then cooled down, poured into distill water and extracted with chloroform (2×100 mL). The combined organic solutions were washed with saturated NaCl solution (2×100 mL), distilled water (1×100 mL), dried over MgSO$_4$, and concentrated under reduced pressure. Crude oil was further purified by column chromatography using hexane/ethyl acetate (50/50) as eluant. TLC (ethyl acetate/Hexane=1/1) $R_f$=0.12. The fraction at $R_f$=0.12 was collected and concentrated to give 5.7 product in 60% yield. $^1$H NMR (300 MHz, CDCl$_3$) δ 2.34 (t, 4H), 2.77 (t, 4H), 3.10-3.60 (m, 22H), 7.40-7.60 (m, 6H).

Scheme 6. The synthesized polymer

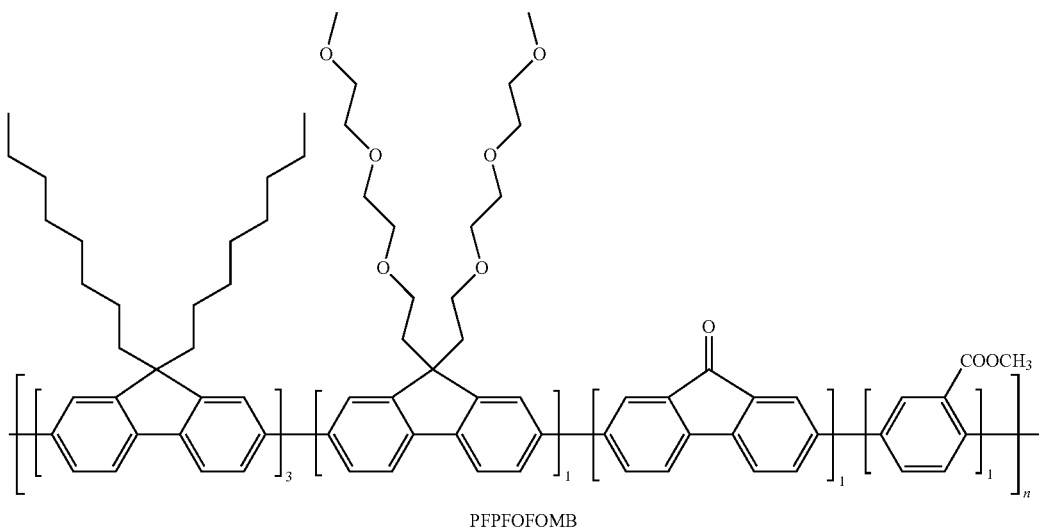

PFPFOFOMB

The polymer synthesized is demonstrated in Schematic 6. This polymer is combined with Si nanoparticles. The Si nanoparticles have an average particle size of 50-70 nm diameter. This Si sample is purchased from Nanostructured & Amorphous Materials Inc. The composition of the electrode laminate is 34% by weight of PFPFOFOMB polymer, and 66% Si nanoparticles. The electrode is cast by a slurry process described below.

Monomer Synthesis

10-Tosyloxy-2,5,8-trioxadecane Triethlyene glycol monomethylether (10 g, 61 mmol) was dissolved in THF (50 mL) and cooled to 0° C. in an ice bath. A solution of KOH (5.6 g, 100 mmol) in 10 mL water was slowly added to the mixture, and then a solution of TsCl (9.5 g, 50 mmol) in 20 mL THF was added drop-wise over 20 min. with vigorous stiffing. After stiffing overnight in an ice bath, the mixture was poured into distilled water (200 mL) and extracted with CH$_2$Cl$_2$ (2×100 mL). The combined organic solutions were washed with saturated NaHCO$_3$ solution (2×100 mL), distilled water (2×100 mL), dried over MgSO$_4$, and concentrated under reduced pressure to give 15.7 g as a clear colorless oil in 99% yield. $^1$H NMR (300 MHz, CDCl$_3$) δ 2.3 (s, 3H), 3.22 (s, 3H), 3.28-3.70 (m, 10H), 4.04 (t, 2H), 7.24 (d, 2H), 7.68 (d, 2H).

2,7-Dibromo-9,9(di(oxy-2,5,8-trioxadecane))fluorine 2,7-dibromofluorene (5.0 g, 15.4 mmol) was dissolved in dried Polymerization Poly(2,7-9,9-dioctylfluorene-co-2,7-9,9-(di(oxy-2,5,8-trioxadecane))fluorine-co-2,7-fluorenone-co-2,5-1-methyl-benzoic ester): A mixture of 9,9-dioctylfluorene-2,7-diboronic acid bis(1,3-propanediol) ester (1.10 g, 1.97 mmol), 9,9-(di(oxy-2,5,8-trioxadecane))fluorine (0.44 g, 0.71 mmol) 2,7-dibromo-9-fluorenone (0.24 g, 0.72 mmol), methyl2,5-dibromobenzoate (0.21 g, 0.72 mmol), (PPh$_3$)$_4$Pd(0) (0.082 g, 0.072 mmol) and several drops of Aliquat 336 in a mixture of 13 mL of THF and 5 mL of 2 M Na$_2$CO$_3$ solution was refluxed with vigorous stirring for 72 h under an argon atmosphere. After reaction stopped, the solution was concentrated by vacuum evaporation and the polymer was precipitated from methanol. The resulting polymer was further purified by precipitating from methanol twice.

PFPFOFOMB and Electrode Characterization

Circular voltamegram (CV) of PFPFOMB was measured against a Li reference. The Polymer was coated on Cu current collector. Electrolyte is 1M LiPF$_6$ in EC/EMC/DMC 1/1/1 with 10% FEC electrolyte. The conditions for CV are polymer weight 70 microgram, voltage step 0.2 mV/s, area 1.6 cm2.

Figure 8:
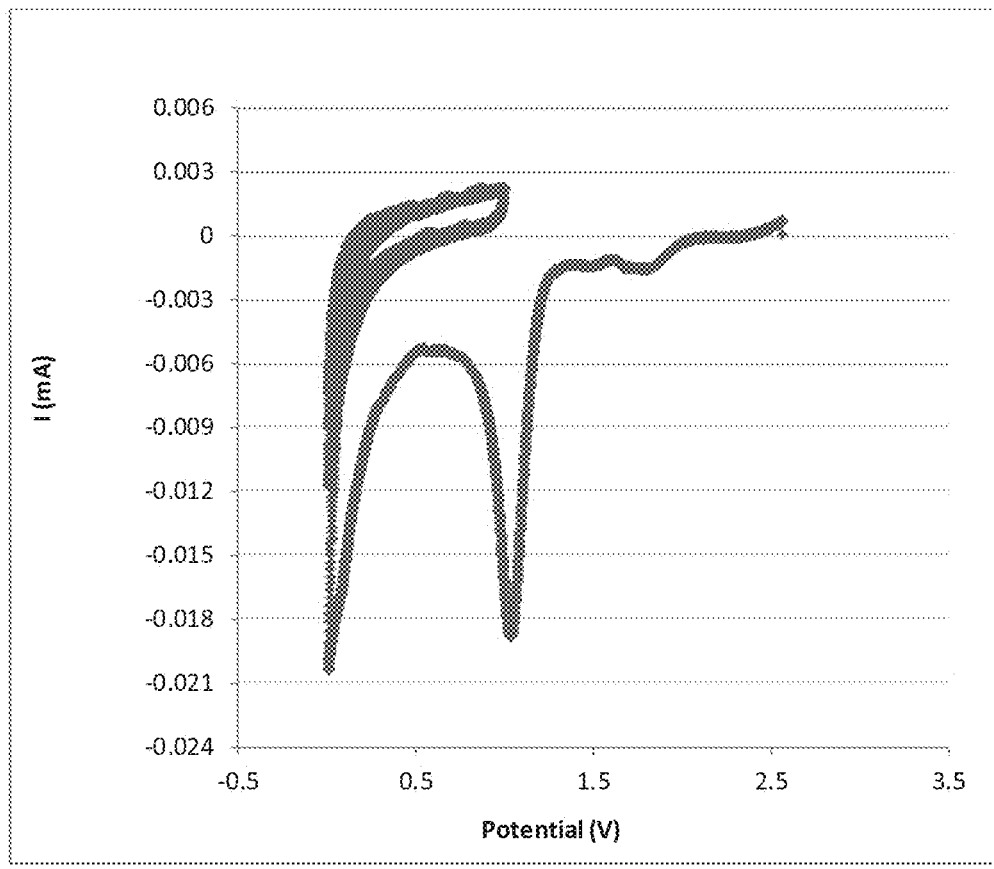
FIG. 8 is the CV of the PFPFOFOMB polymer vs. Li/Li+.

FIG. 8 is the CV of the PFPFOFOMB polymer vs. Li/Li+. The swelling rate of this PFPFOFOMB polymer was also measured against the 1M LiPF6, EC/DEC (1:1, wt) electrolyte, and compared with the PFFOMB polymers. The film thickness is controlled around 10 micron. PFPFOFOMB polymer has much higher swelling in the electrolyte compared to the PFFOMB polymer.

Figure 9:
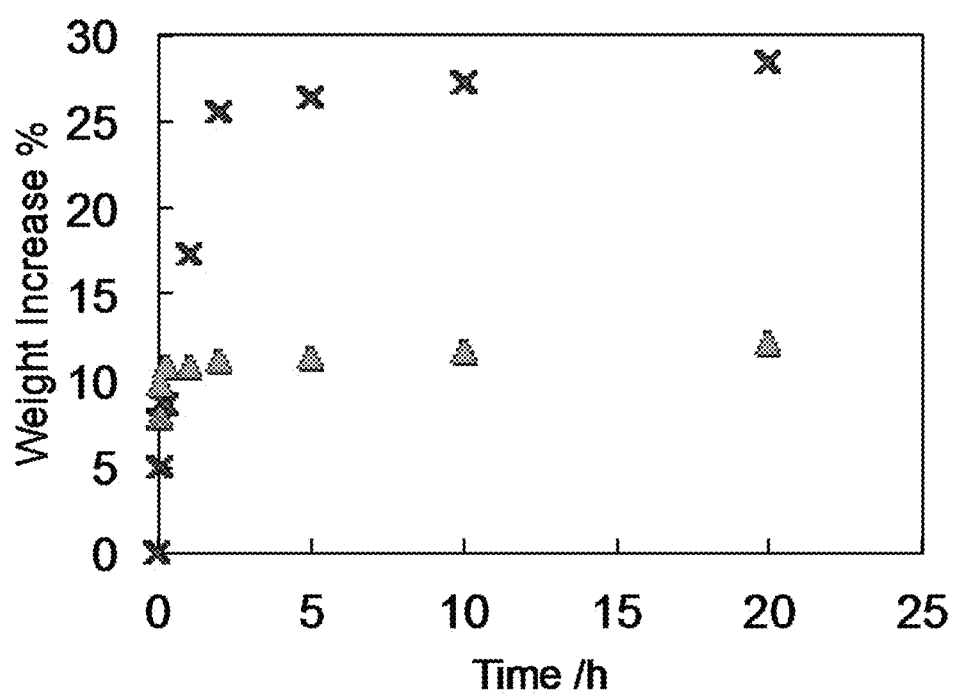
FIG. 9 is a test of PFPFOFOMB (cross) vs. PFFOMB (triangle) polymers.

FIG. 9 is a test of PFPFOFOMB (cross) vs. PFFOMB (triangle) polymers. The polymer binder solution was made by dissolving 90 mg of polymer binder in 2.6 mL of N-methylpyrrolidone (NMP) solution with magnetic stiffing. 180 mg of the Si nano powder was added into the binder solution and sonicated for 2 minutes to make uniformed slurry. The slurry was coated on a piece of Cu current collector with a doctor blade at a gap of 25 μm. All the processes were done in the inert atmosphere glove box. The laminate was vacuum dried at 120° C. over night. The laminate thickness 12 μm. The electrode was pouch out with a 9/16" pouch. The weight of active materials Si is 0.28 mg. The electrode was assembled into a coin cell with Li metal counter electrode, Celgard® 2500 separator and 1M $LiPF_6$ in EC/EMC/DMC 1/1/1 with 10% FEC electrolyte. FIG. 1 shows the coin cell cycling test in 30° C. temperature oven at C/10 current (0.12 mA) between 0.01V-1V voltage range. The C-rate calculation of the Si based electrode is assuming the Si has the theoretical capacity of 4200 mAh/g.

Figure 10:
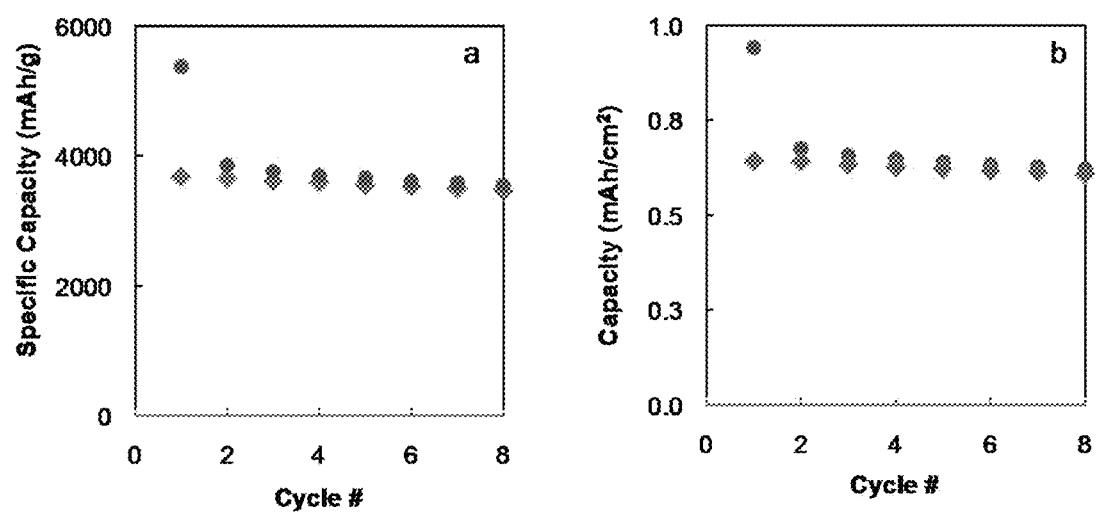
FIG. 10 is the cycling capacity of the Si/PFPFOFOMB electrode at C/10 rate. (a) The electrode specific capacity based on Si weight. (b) The electrode area specific capacity.

FIG. 10 is the cycling capacity of the Si/PFPFOFOMB electrode at C/10 rate. (a) The electrode specific capacity based on Si weight. (b) The electrode area specific capacity. The C-rate performance of the Si/PFPFOFOMB composite electrode was also tested in 1 M LiPF6 EC/DEC (3:7 weight) 30% FEC and reported in FIG. 11.

Figure 11:
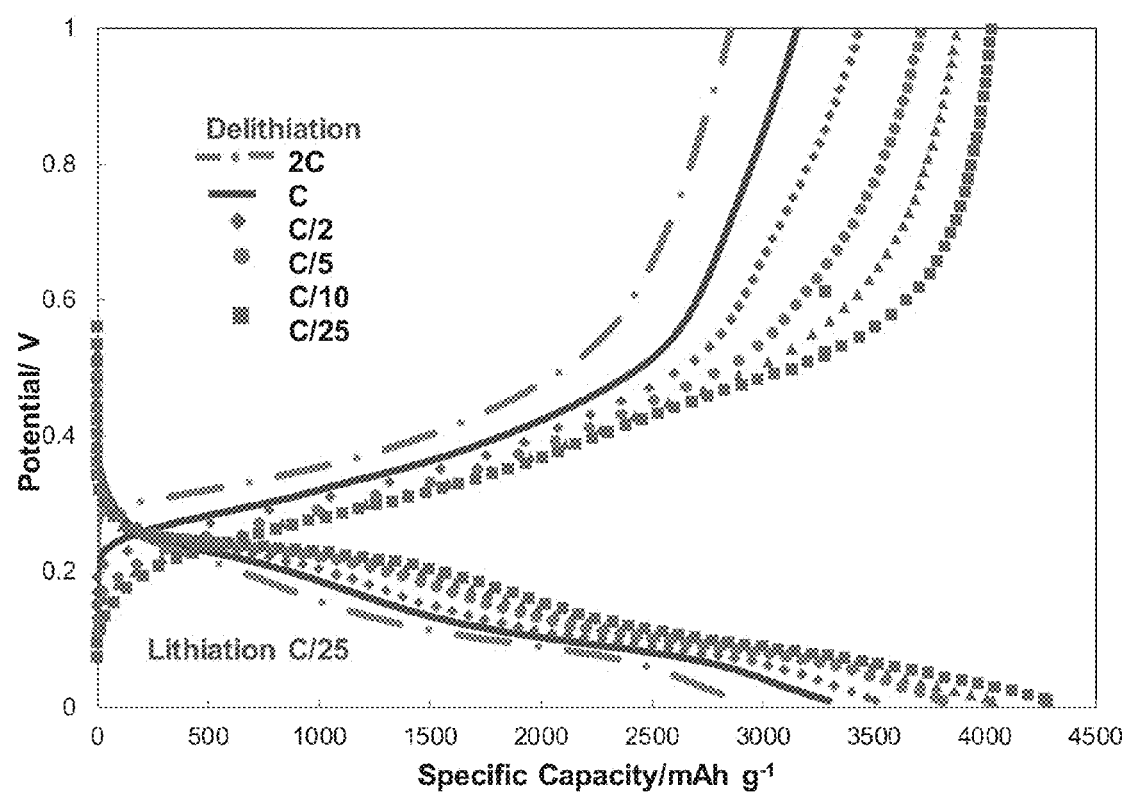
FIG. 11 is the C/25 lithiation and variable delithiation rate of the composite electrode.

FIG. 11 is the C/25 lithiation and variable delithiation rate of the composite electrode. The PFPFOFOMB polymer based Si electrode has much improved performance and can deliver the full theoretical capacity of the Si particle (~3500 mAh/g) with good rate retention. The adhesion of PFPFOFOMB/Si is much stronger than that of the PFFOMB/Si based system. Adhesion and swelling are keys for the improve performance of the PFPFOFOMB conductive polymer over PFFOMB polymer.

Further embodiments of this invention enable three aspects of improvement to the binders described above, 1) low cost starting materials and a low cost manufacturing process, 2) adjustable electronic properties without complicated material design and manufacture, and 3) adjustable adhesion and electrolyte swelling without complicated material design and manufacture.

Various embodiments also provide a low cost way to achieve better performance of the electrode binder in lithium ion batteries especially for Si, Sn, or graphite and alloy based volume changing lithium storage materials.

Various embodiments also describe new material for design and synthesis of the conductive binder. For example, the binders described below are side chain electronic conducting rather than main chain conducting as described above.

Attempts to find electronic and low cost binders has led us to the utilization of the comb branch type of polymer with a non-conductive polymethacrylate backbone and conjugated side chained polymer system. Two types of conductive moiety anthracene and pyrene have been characterized as shown below: (a) anthracene; (b) pyrene.

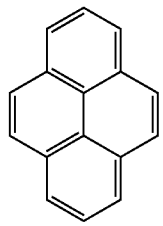

a

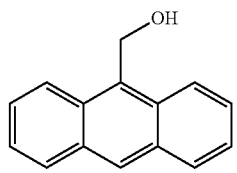

b

The functionalized anthracene and pyrene can be purchased from Aldrich Chemical company. Below illustrates the functionalized chemicals with hydroxide groups from Aldrich: (a) unctionalized anthracene and (b) functionalized pyrene.

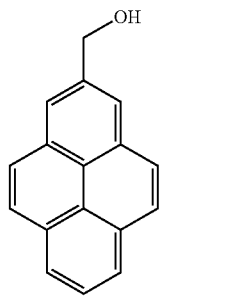

A methacrylate functional group can be connected to the hydroxyl group of the anthracene or pyrene as shown in the reaction Scheme 1 and 2. These methacrylate functional groups can go through a polymerization process to generate polymers.

Scheme 1. Synthesis of methacrylate functionalized anthracene

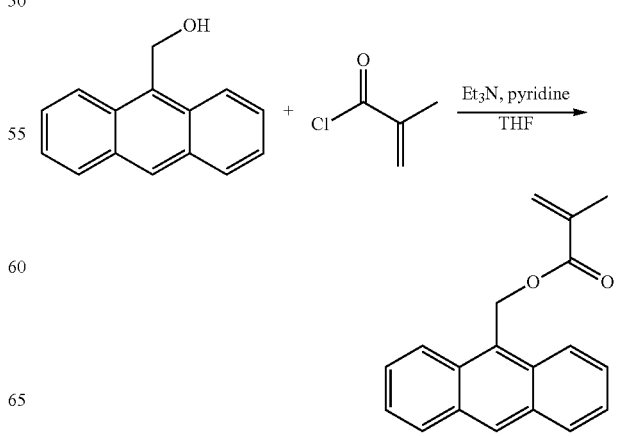

Scheme 2. Synthesis of methacrylate functionalized pryrene

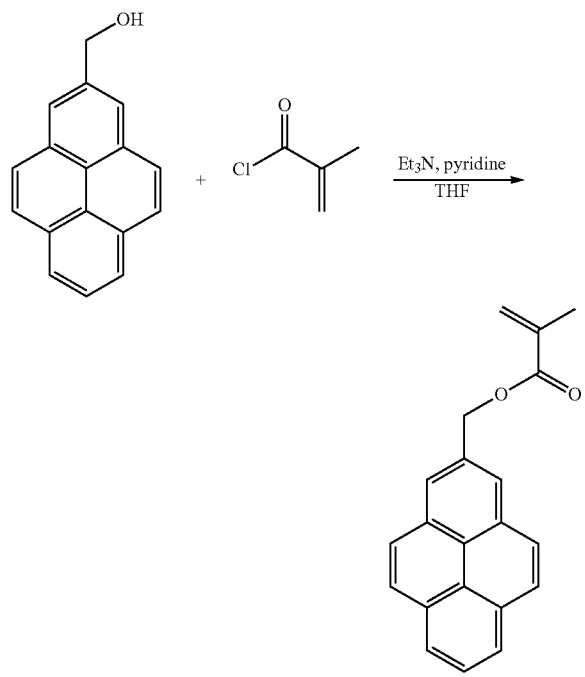

One embodiment of the invention is to use the methacrylate anthracene monomer made in Scheme 1 reaction to polymerize into methacrylate polymers as shown in Scheme 3. The side chains are anthracene units. The stacking of the anthracene units provides electronic conduction in this polymer. This conductive polymer is side chain electronic conducting. The polymer in Scheme 3 is referred to as PMAN.

Scheme 3. Synthesis of methacrylate anthracene polymer

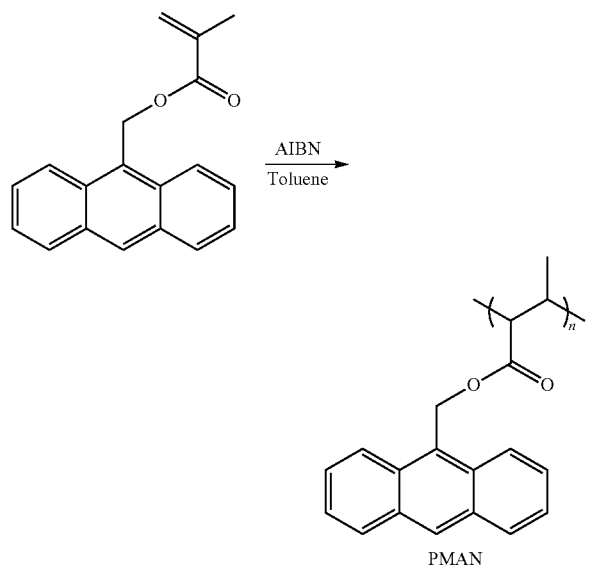

The PMAN polymer can be partially hydrolized to contain carboxylic acid groups in the polymer side chain according to Scheme 4. Depending on the conditions of the hydrolysis, the ratio between a/b can vary significantly. A longer hydrolysis time will lead to lower ratio of anthracene and higher ratio of carboxylic acid. These acid groups will provide additional bonding with a Si particle surface to improve adhesion between the binder and the Si particles. Alternatively, the acid groups can be introduced during the polymerization process as in Scheme 5. The feeding ratio between the two monomers determines the a/b ratio. In both cases, the final polymers are random copolymers.

Scheme 4. Methacrylate anthracene polymer with carboxylic acid groups via hydrolysis process

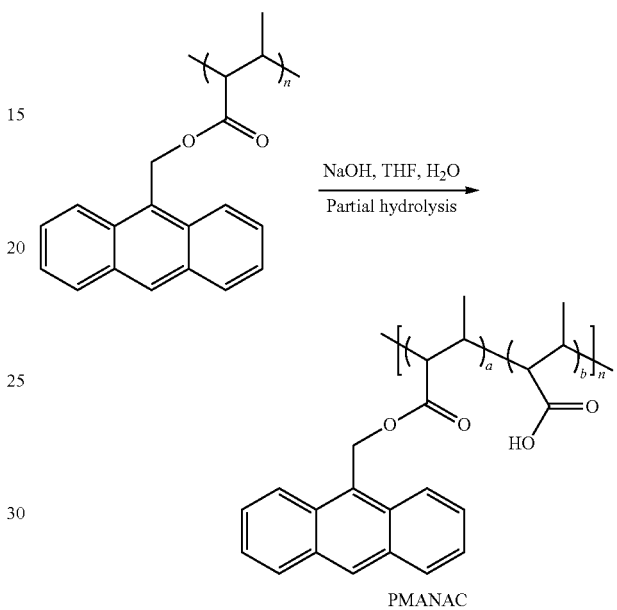

Scheme 5. Methacrylate anthracene carboxylic acid polymer made by copolymerization process

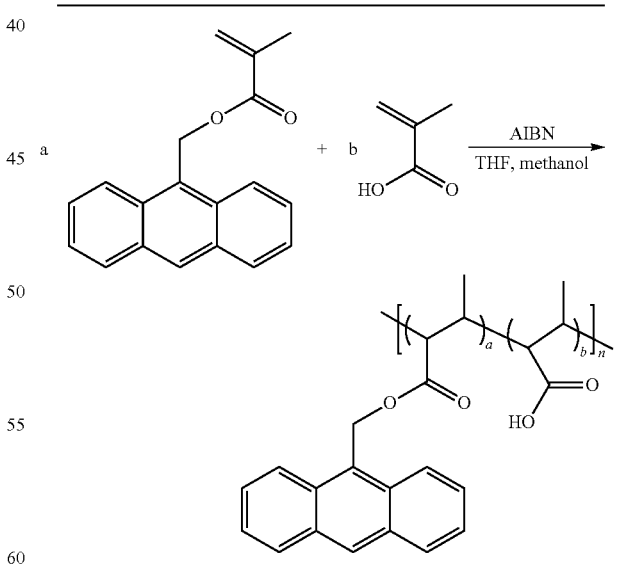

To further adjust the adhesion and electrolyte intake properties, a short oligoethyleneoxide monomethylether chain can be copolymerized into the polymer structure as shown in Scheme 6. The final polymer is a random copolymer of the anthracene and oligoethyleneoxide monomethylether branches. The ratio of a/b in the PMANEO polymer is determined by the reactant ratio.

Scheme 6. Copolymer to include triethyleneoxide monomethylether branches

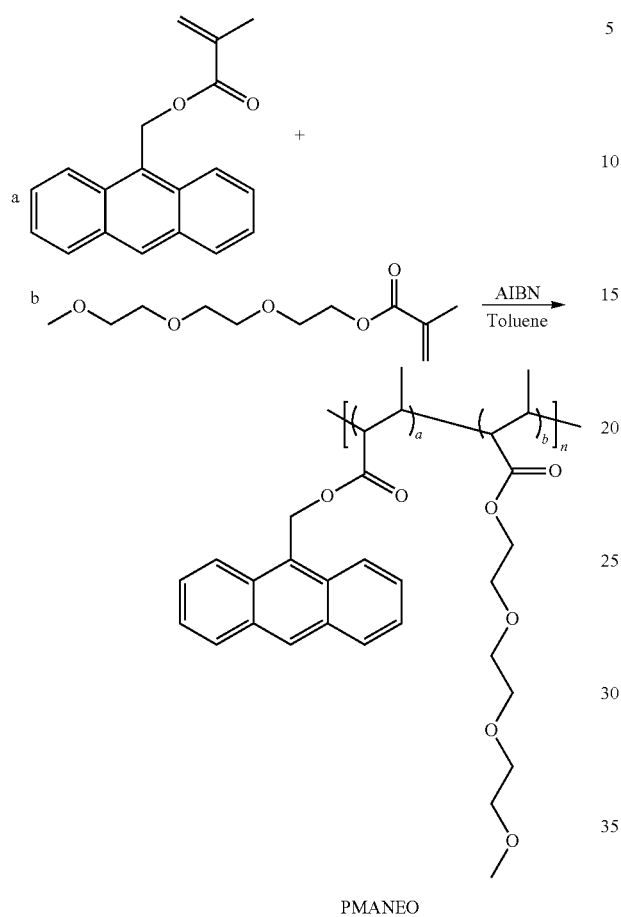

PMANEO

Carboxylic acid groups can also be incorporated into the PMANEO polymer in two different methods. The hydrolysis method is shown in Scheme 7, and the copolymerization of monomers with carboxylic acid group as in Scheme 8. Both PMANEOACs are a random copolymer structures.

Scheme 7. Hydrolysis to generate random co-polymer PMANEOAC

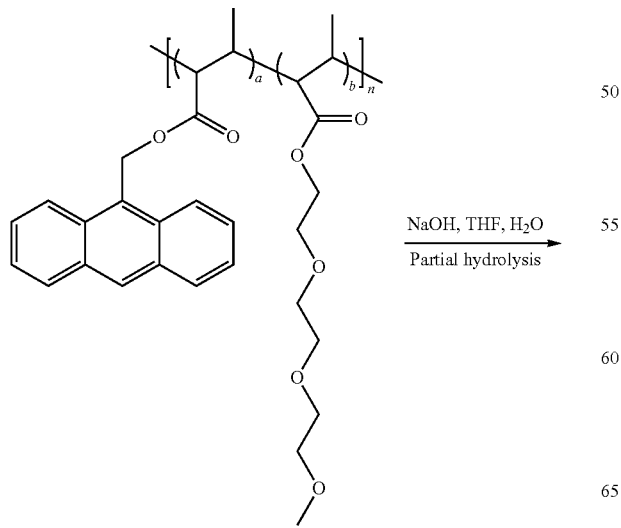

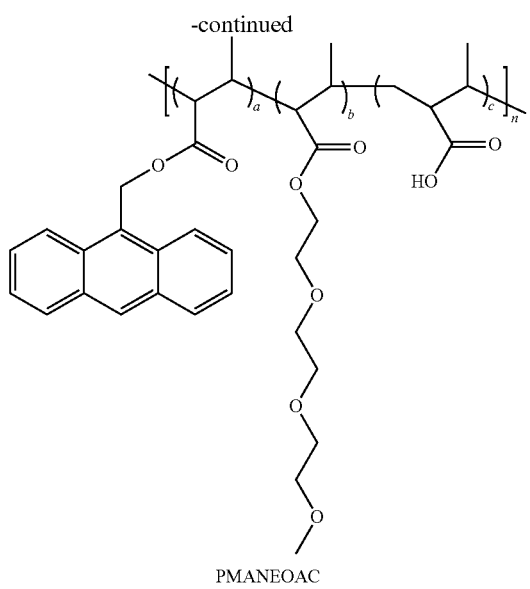

PMANEOAC

Scheme 8. Random copolymer of PMANEOAC synthesized by copolymerization of three monomers

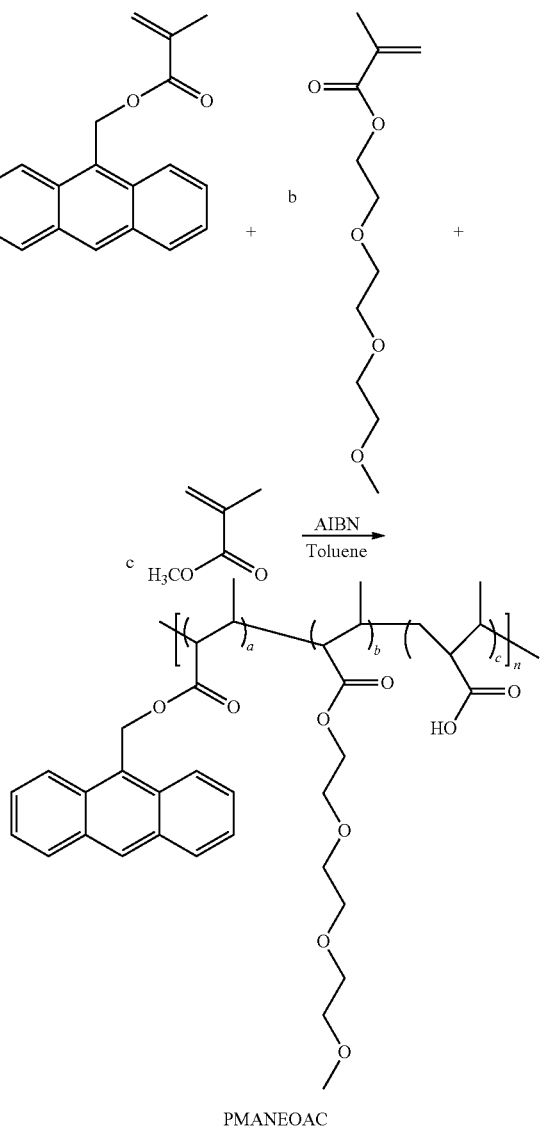

PMANEOAC

Scheme 9 shows the generic structure of the copolymers. The $R_1$, $R_2$ and $R_3$ are randomly distributed, and the ratio of a/b/c reflect the relative abundance of the side chain unit. The $R_1$ can be either one of a type of structure among the naphthalene to fluorene or a mixture of the structures. The $R_2$ is the oligoethyleneoxide monomethylether and the variable m can range from 0 to 1000, and can be exact or an average. The preferred range of values of m are from 0 to 3. The $R_3$ is a hydrogen (H) to make the c structure carboxylic acid units.

The function of $R_1$ side chains is to make the polymer conductive based on a side chain stacking arrangement. The mixing of the $R_1$ possible structures from naphthalene to fluorene can fine tune the band gap of the overall polymer to improve the doping properties and electronic conducting capabilities.

The $R_2$ units are used to adjust both the ability for the polymers to swell when exposed to an electrolyte. The high polarity of the ethyleneoxides can also provide adhesion between the particles and the polymer itself.

The $R_3$ units are carboxylic acid groups. They are used to form ester chemical bonding to the $Si_2O$ surface on Si particle. This chemical bonding significantly improves the adhesion between the particles and the binder.

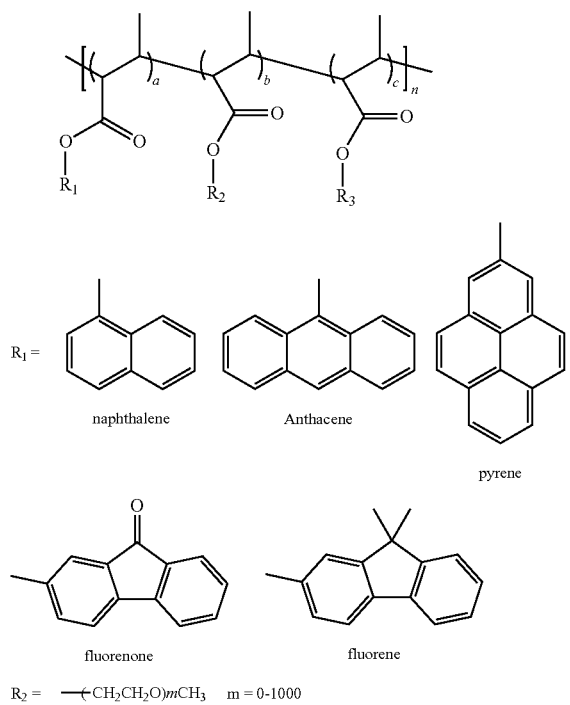

Scheme 9. The generic structures of the copolymer

One embodiment includes the synthesis of the conductive polymers including $R_1$ and $R_2$ with the third polymer c=0, so $R_3$ is not included in the copolymer based on the Scheme 9 generic structure.

Referring to Table 1 below, both the Anthracene/ethyleneoxide (EO) copolymers and pyrene/EO copolymer compositions are illustrated by weight.

TABLE 1

| Anthracene (R1) | Triethyleneoxide (R2) | Pyrene (R1) | Triethyleneoxide (R2) |
|---|---|---|---|
| 100% | 0% | 100% | 0% |
| 90% | 10% | 90% | 10% |
| 70% | 30% | 70% | 30% |
| 50% | 50% | 50% | 50% |

The electrode composition and structure with Si and conductive polymer are designed around the specification below.
1. Si materials 50-70 nm Si nanoparticles
2. Polymer to Si weight composition is 33% and 67%.
3. Electrode thickness: ~10 micron
4. Area loading: ~1 mAh/cm2

Examples of the polymers synthesized, electrode compositions and cycling results. Polymer structure is R1 is anthracene, b=0 and c=0 based on Scheme 9.

TABLE 2

Electrode composition and performance summary. See also FIG. 12.

| Polymer/Si weight ratio | Mass Loading (Si Loading) (mg/cm2) | $1^{st}$ Charging (mAh/g, mAh/cm2) | $1^{st}$ CE | $5^{st}$ CE |
|---|---|---|---|---|
| Ant (5%):Si (95%) | 0.31 ± 0.041 (0.29 ± 0.041) | 3150 ± 277, 0.91 | 0.74 | 0.98 |
| Ant (10%):Si (90%) | 0.42 ± 0.038 (0.38 ± 0.038) | 2380 ± 147, 0.91 | 0.73 | 0.97 |
| Ant (10%):Si (90%) | 0.037 (0.034) | 4500, 0.24 | 0.71 | |

Figure 12:
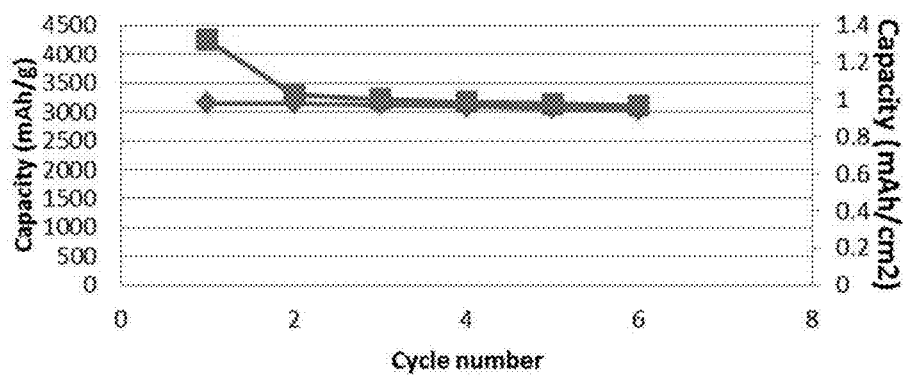
FIG. 12 illustrates electrode performance based on cycling at C/10 rate at 1V to 0.01 V voltage window.
Figure 12:
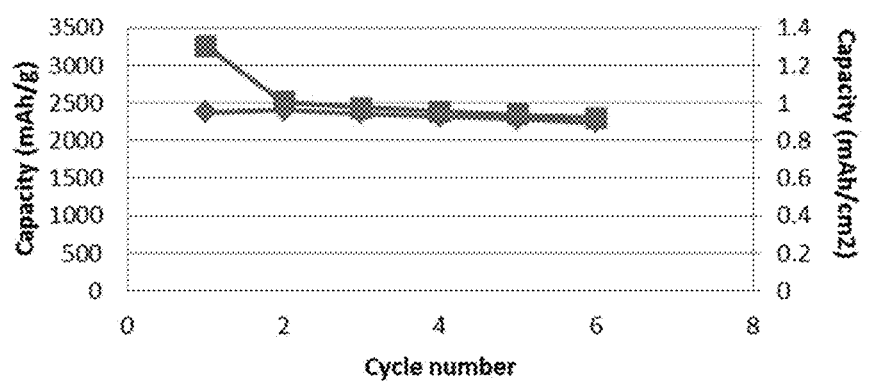
Figure 12:
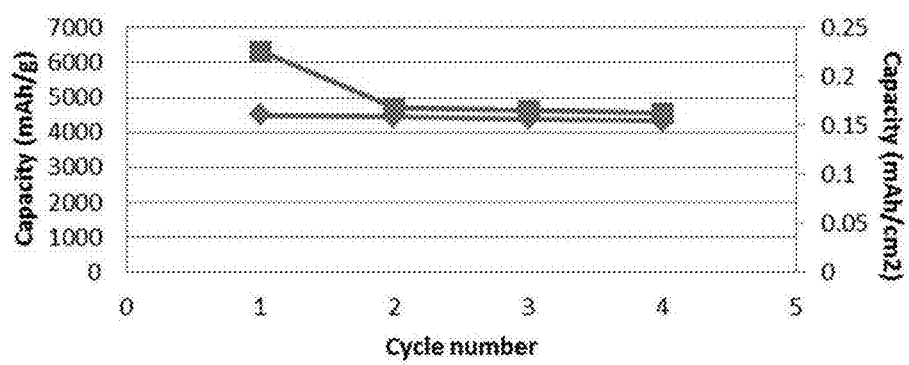

FIG. 12 illustrates electrode performance based on cycling at C/10 rate at 1V to 0.01 V voltage window. FIG. 12(a) illustrates electrode performance of Ant (5%):Si (95%) (0.31 mg/cm2) (Cycling rate: C/10). FIG. 12(b) illustrates electrode performance of Ant (10:Si (90%) (0.42 mg/cm2) (Cycling rate: C/10). FIG. 12(c) illustrates electrode performance of Ant (10%):Si (90%) (0.037 mg/cm2) (Cycling rate: C/10).

TABLE 3

Electrode composition and performance summary. Polymer structure is R1 is Pyrene, b = 0 and c = 0 based on Scheme 9. See also FIG. 13.

| Polymer/Si weight ratio | Mass Loading (Si Loading) (mg/cm2) | $1^{st}$ Charging (mAh/g, mAh/cm2) | $1^{st}$ CE | $3^{rd}$ CE |
|---|---|---|---|---|
| Pyr (33%):Si (67%) | 0.24 ± 0.034 (0.16 ± 0.034) | 2730 ± 357, 0.44 | 0.68 | 0.95 |

Figure 13:
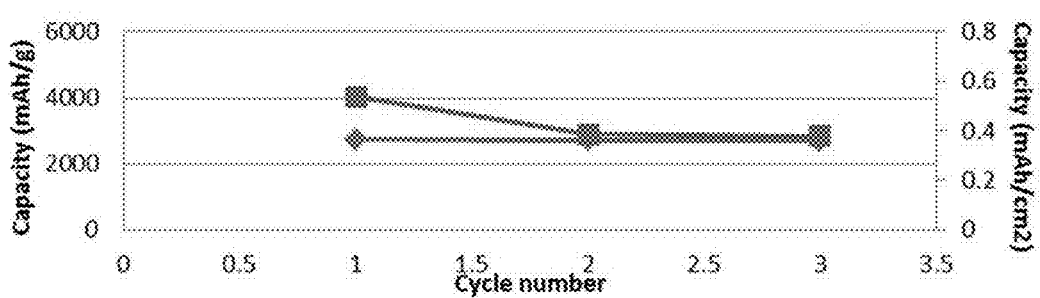
FIG. 13 is

FIG. 13 illustrates electrode performance based on cycling at C/10 rate at 1V to 0.01 V voltage window of Pyr (33%):Si (67%) (0.24 mg/cm2) (Cycling rate C/10).

TABLE 3

Electrode composition and performance summary. Polymer structure is R1 is anthracene and R2 is triethyleneglycol monomethylether, c = 0 based on Scheme 9. See also FIG. 14.

| a:b weigh ratio is 7:3 Si is 67% of the electrode weight | Mass Loading (Si Loading) (mg/cm2) | $1^{st}$ Charging (mAh/g, mAh/cm2) | $1^{st}$ CE | $2^{nd}$ CE |
|---|---|---|---|---|
| Ant0.7-co-TEG0.3 (33%):Si (67%) | 0.34 ± 0.034 (0.23 ± 0.034) | 2930 ± 273, 0.66 | 0.74 | 0.96 |

TABLE 3-continued

Electrode composition and performance summary. Polymer structure is R1 is anthracene and R2 is triethyleneglycol monomethylether, c = 0 based on Scheme 9. See also FIG. 14.

| a:b weigh ratio is 7:3 Si is 67% of the electrode weight | Mass Loading (Si Loading) (mg/cm2) | 1st Charging (mAh/g, mAh/cm2) | 1st CE | 2nd CE |
|---|---|---|---|---|
| Ant0.7-co-TEG0.3 (33%):Si (67%) | 0.77 ± 0.036 (0.52 ± 0.036) | 3100 ± 133, 1.6 | 0.71 | 0.94 |

Figure 14:
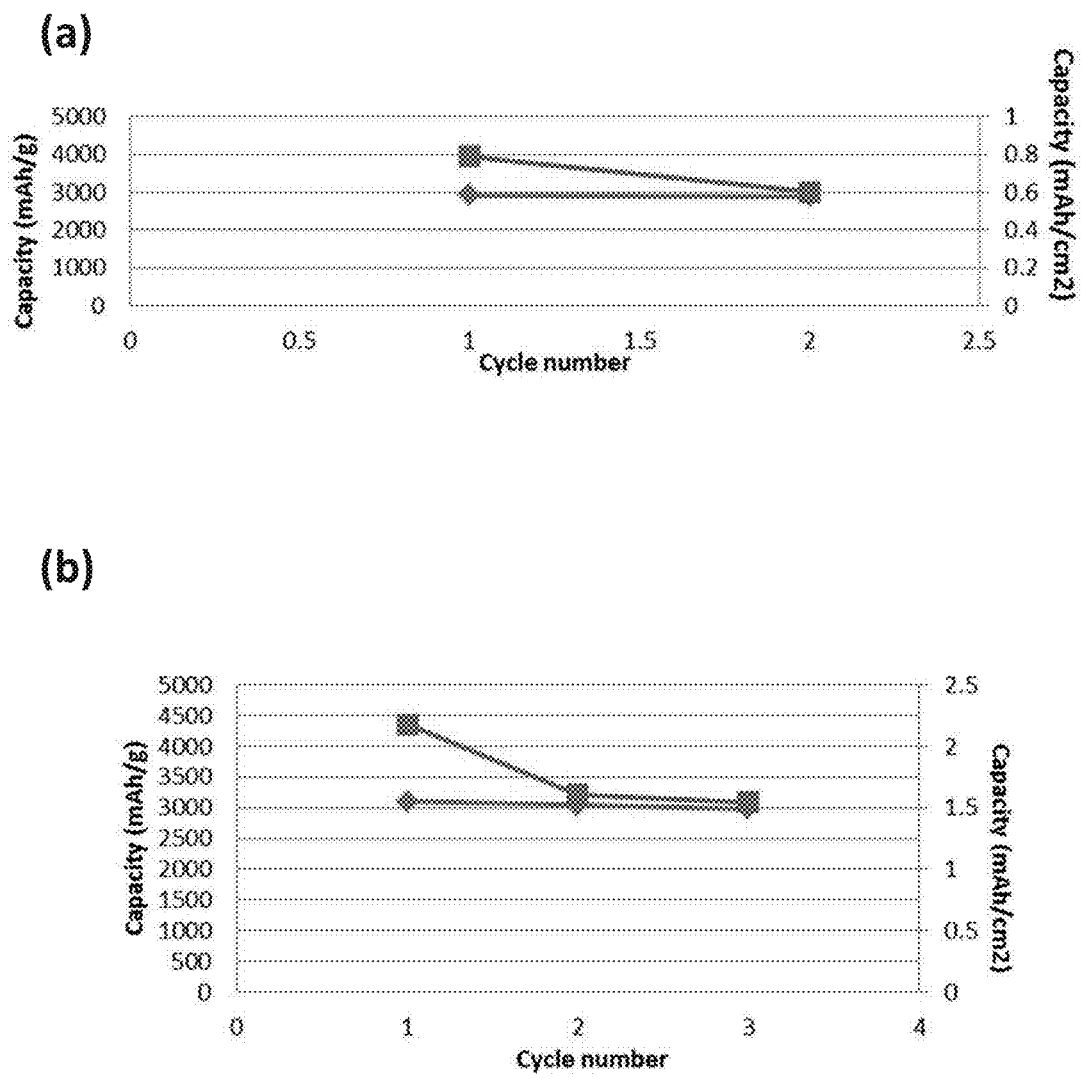
FIG. 14 illustrates electrode performance based on cycling at C/10 rate at 1V to 0.01 V voltage window.

FIG. 14 illustrates electrode performance based on cycling at C/10 rate at 1V to 0.01 V voltage window. FIG. 14(a) illustrates electrode performance of Ant0.7-co-TEG0.3 (33%):Si (67%) (0.34 mg/cm2) (Cycling rate: C/10). FIG. 14(b) illustrates electrode performance of Ant0.7-co-TEG0.3 (33%):Si (67%) (0.77 mg/cm2) (Cycling rate: C/10).

TABLE 4

Electrode composition and performance summary. Polymer structure is R1 is pyrene and R2 is triethyleneglycol monomethylether, c = 0 based on Scheme 9. See also FIG. 15.

| a:b weigh ratio is 7:3 | Mass Loading (Si Loading) (mg/cm2) | 1st Charging (mAh/g, mAh/cm2) | 1st CE | 4th CE |
|---|---|---|---|---|
| Pyr0.7-co-TEG0.3 (5% by weight):Si (95% by weight) | 0.11 ± 0.036 (0.11 ± 0.036) | 4670 ± 973, 0.50 | 0.69 | 0.96 |
| Pyr0.7-co-TEG0.3 (33%):Si (67%) | 0.22 ± 0.034 (0.15 ± 0.034) | 3370 ± 478, 0.51 | 0.71 | 0.96 |

Figure 15:
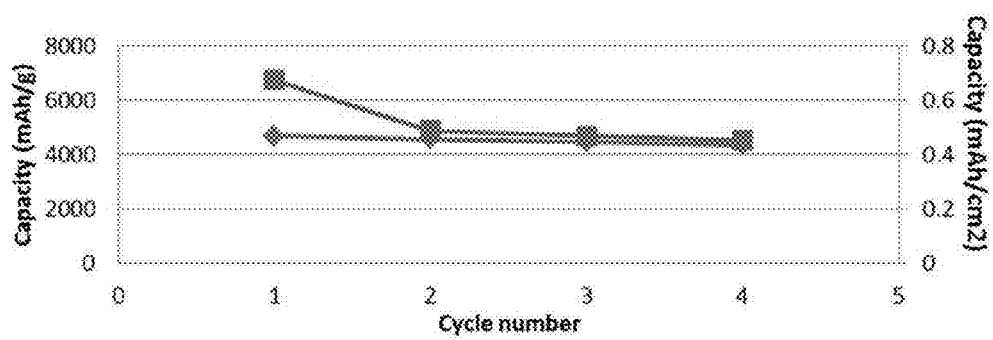
FIG. 15 illustrates electrode performance based on cycling at C/10 rate at 1V to 0.01 V voltage window.
Figure 15:
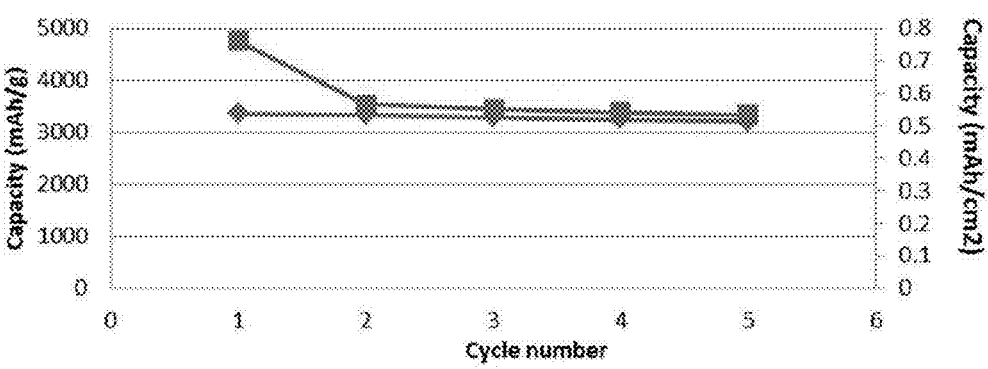
Figure 15:
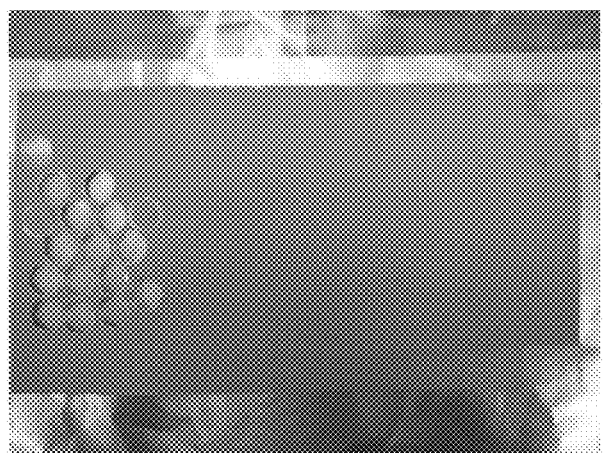
Figure 16:
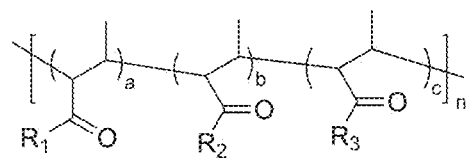
FIG. 16 illustrates the generic structures of the copolymer.
Figure 16:
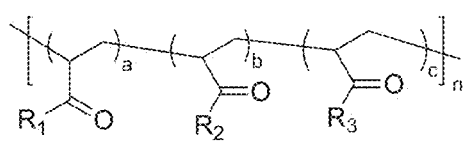
Figure 16:
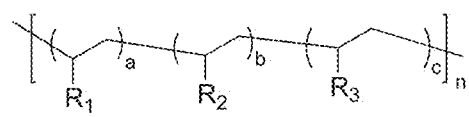

FIG. 15 illustrates electrode performance based on cycling at C/10 rate at 1V to 0.01 V voltage window. FIG. 15(a) illustrates electrode performance of Pyr0.7-co-TEG0.3(%):Si (95%)(0.11 mg/cm2) (C/10). FIG. 15(b) illustrates electrode performance of Pyr0.7-co-TEG0.3 (33%):Si (67%)(0.22 mg/cm2) (C/10). FIG. 15(c) illustrates the electrode appearance.

Planned synthesis of $R_1$=pyrene, b=0, $R_3$=H, Na or Li. a/c ratio various for the Si and Si based alloy materials. There are two routes for synthesis of this class of polymer, based on Scheme 4 or 5 using methacrylate pyrene monomer. The polymer is later converted into Na or Li salts by neutralizing in NaOH or LiOH solution. This bind will be used to combine with 3M Si alloy based anode materials.

General Electrode Compositions

The electrode is a composite of at least one active material particle and conductive polymer binder.

The active material particles can be Si micron or nano particles, or can be Sn micron or nano particles; or can be any alloy that contain Si, Sn, or graphite and other elements.

The active material particles can also be graphite particles mixed with the above mentioned Si and Sn materials in different compositions.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

Possible Backbone Structures of the Conductive Polymer Binder

Polymethacrylate Ester

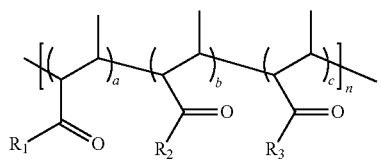

Polyacrylate Ester

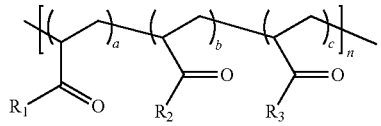

Polyvinylalcohol ether (if the connection between R and the backbone is oxygen

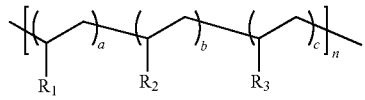

n can be from 1 to 10 million a, b, c are the ratios between the numbers of $R_1$, $R_2$ and $R_3$ groups.

a+b+c=1; where the possible number of a=0–1, the possible number of b=0–1 and the possible number of c=0–1.

Possible $R_1$ Structures

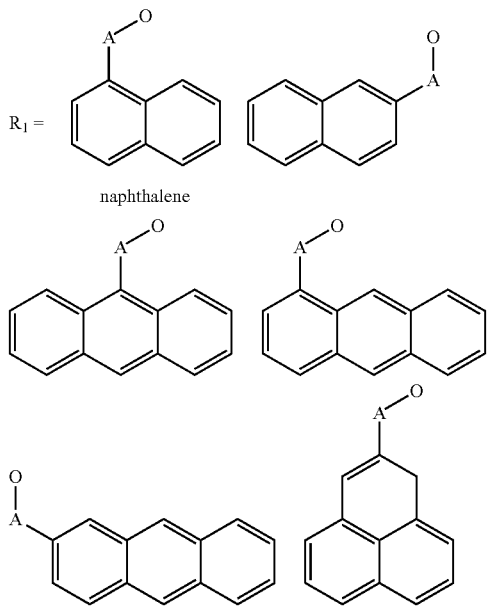

naphthalene

-continued

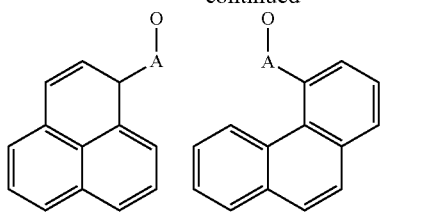

Anthracene

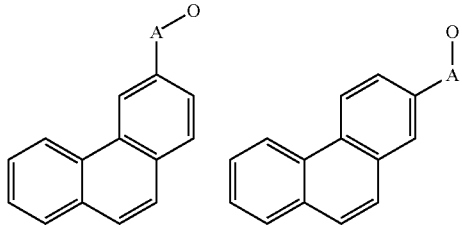

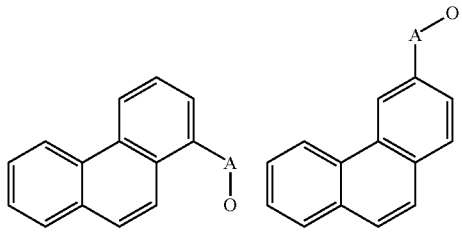

pyrene

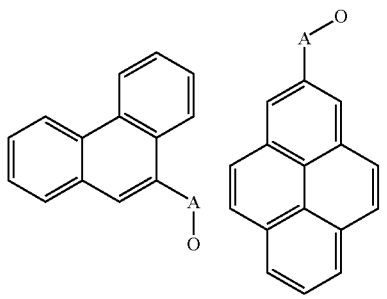

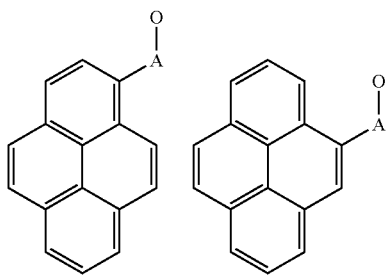

fluorene

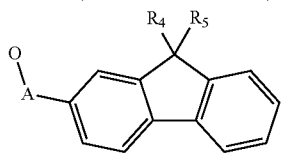

-continued

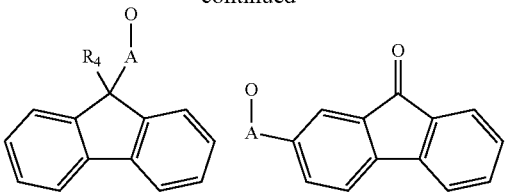

fluorenone

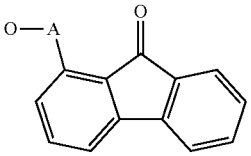

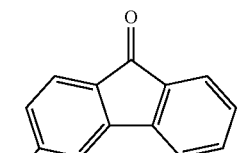

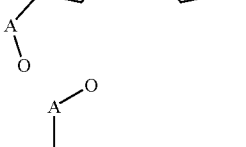

oligophenylene
m = 0-20

R4 and R5: Alkyl or hydrogen

A=$(CH_2)_a$, a=0-100

$R_1$ can be pure or the mixtures any of the above structures.

Oxygen also can be all or partially replaced with NH, or NCH$_3$

The end oxygen or/and nitrogen are connected with the polymer backbones.

Possible $R_2$ Structures $R_2$=$(OCH_2CH_2)_m CH_3$ m=0-1000

The end oxygen is connected with the polymer backbones.

$R_2$ can be a mixture of the different length or oligoethyleneoxide methylether.

Possible $R_3$ Structures $R_3$ = hydrogen   H hydroxyl   OH

Alkyloxide   $CH_3(CH_2)_aO$

-continued

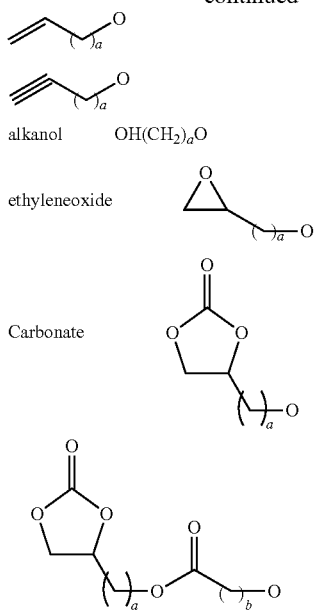

alkanol  OH(CH₂)$_a$O ethyleneoxide

Carbonate

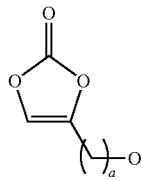

The ester Oxygen can be NH or NCH3.

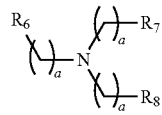

trialkylamine

R₆, R₇, R₈ can be OH, NH₂, O, NH or H

All of the O groups can be replaced by the NH or NCH3 group.
a = 1-100

R₃ can be pure or mixtures of any of the above structures. The end oxygen or/and nitrogen are connected with the polymer backbone.

Typical Synthetic Procedures for the Conductive Polymer Binders

Synthesis of 9-anthrylmethyl methacrylate

9-Anthracenemethanol (30 g) was dissolved in freshly distilled THF (150 mL). To the solution triethylamine (30 mL) and pyridine (20 mL) were added and the mixture was cooled down to 0° C. Then methacryloyl chloride (21 mL) was added dropwise. After the addition, ice-water bath was removed and the mixture was stirred for 1 hour. After water (75 mL) was added to the reaction flask, the solution was transferred into separatory funnel and extracted with diethyl ether (500 mL). The extract was washed with aqueous HCl (1 M, 150 mL), aqueous NaHCO₃ (5%, 150 mL), and brine (150 mL), respectively. The solvent was evaporated in vacuum and recrystallized with methanol. (Product: 21 g) ¹H NMR (500 MHz, CDCl₃): δ 8.55 (s, 1H), 8.41 (d, J=8.9 Hz, 2H), 8.07 (d, J=8.4 Hz, 2H), 7.61 (t, J=7.7 Hz, 2H), 7.53 (t, J=7.9 Hz, 2H), 6.25 (s, 2H), 6.08 (s, 1H), 5.54 (s, 1H), 1.95 (s, 3H) ppm.

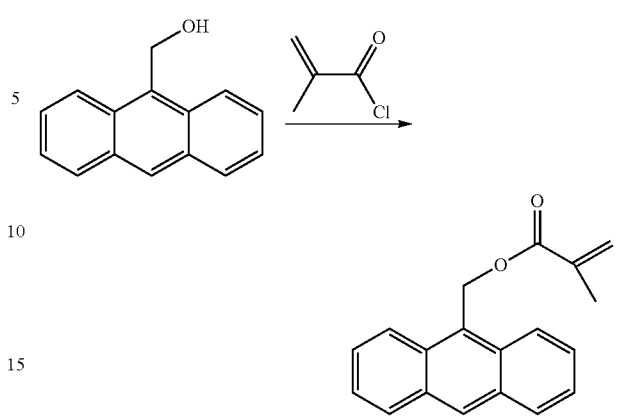

Synthesis of 1-pyrenemethyl methacrylate

The same procedure as that of 9-anthrylmethyl methacrylate was executed. 1-pyrenemethanol (30 g), freshly distilled THF (280 mL), triethylamine (28 mL), pyridine (18 mL), methacryloyl chloride (19 mL) was used. (Product: 43 g) ¹H NMR (500 MHz, CDCl₃): δ 8.35 (d, J=9.2 Hz, 1H), 8.25 (t, J=6.6 Hz, 2H), 8.21 (d, J=9.8 Hz, 2H), 8.12 (t, J=4.6 Hz, 3H), 8.06 (m, 1H), 6.18 (s, 1H), 5.95 (s, 2H), 5.59 (s, 1H), 2.00 (s, 3H) ppm.

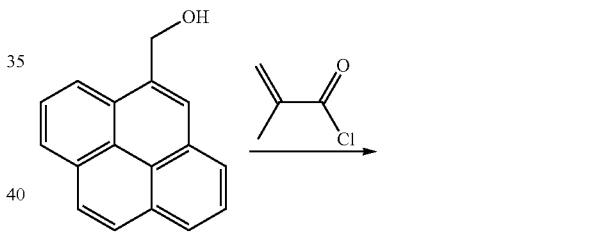

Synthesis of poly(9-anthrylmethyl methacrylate)

9-Anthrylmethyl methacrylate (1.2 g) was dissolved in freshly distilled THF (4 mL). To the solution 2,2'-azobis(2-methylpropionitrile) (AIBN) (8 mg) was added. The mixture was degassed by three freeze-evacuate-thaw cycles and heated to 60° C. for 24 hours. The product was purified by precipitation with diethyl ether. (Product: 0.70 g) ¹H NMR (500 MHz, CDCl₃): δ 7.84 (br), 7.12 (br), 5.64 (br), 0.63 (br) ppm. GPC(CHCl₃, poly(styrene) standards, $M_n$=17000, PDI=2.2)

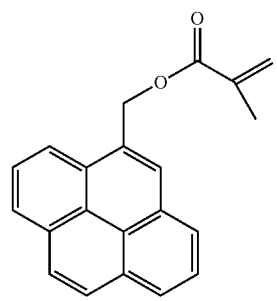

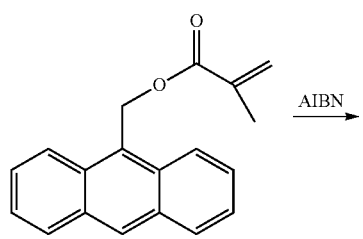

Synthesis of poly(1-pyrenemethyl methacrylate)

1-Pyrenemethyl methacrylate (1.2 g) was dissolved in freshly distilled THF (4 mL). To the solution 2,2'-azobis(2-methylpropionitrile) (AIBN) (8 mg) was added. The mixture was degassed by three freeze-evacuate-thaw cycles and heated to 60° C. for 24 hours. The product was purified by precipitation with diethyl ether. (Product: 1.1 g) $^1$H NMR (500 MHz, CDCl$_3$): δ 7.48 (br), 5.09 (br), 1.80 (br), 0.71 (br) ppm. GPC(CHCl$_3$, poly(styrene) standards, M$_n$=21000, PDI=2.5)

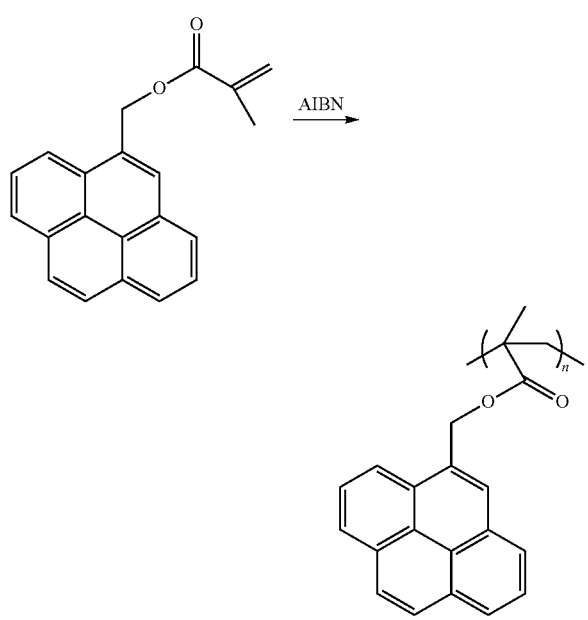

Synthesis of poly(9-anthrylmethyl methacrylate-co-triethylene glycol methyl ether methacrylate)

9-Anthrylmethyl methacrylate (5.0 g) and triethylene glycol methyl ether methacrylate (1.8 g) were dissolved in freshly distilled THF (15 mL). To the solution 2,2'-azobis(2-methylpropionitrile) (AIBN) (20 mg) was added. The mixture was degassed by three freeze-evacuate-thaw cycles and heated to 60° C. for 24 hours. The product was purified by precipitation with diethyl ether. (Product: 3.2 g) $^1$H NMR (500 MHz, CDCl$_3$): δ 8.20 (br), 7.84 (br), 7.28 (br), 5.85 (br), 3.42 (br), 1.56 (br), 0.75 (br) ppm. GPC(CHCl$_3$, poly(styrene) standards, M$_n$=19000, PDI=2.3)

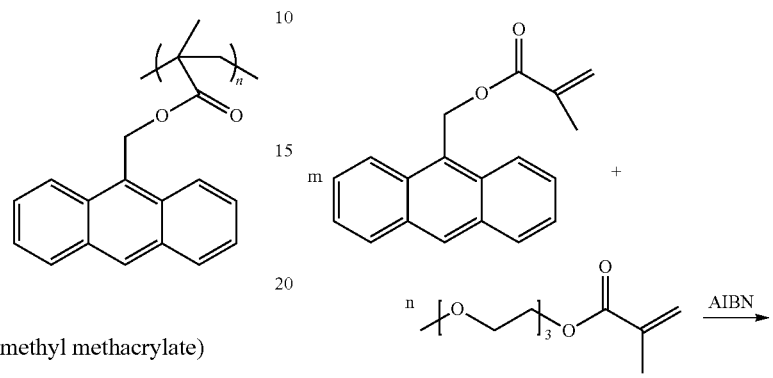

Synthesis of poly(1-pyrenemethyl methacrylate-co-triethylene glycol methyl ether methacrylate)

1-Pyrenemethyl methacrylate (5.0 g) and triethylene glycol methyl ether methacrylate (1.7 g) were dissolved in freshly distilled THF (15 mL). To the solution 2,2'-azobis(2-methylpropionitrile) (AIBN) (20 mg) was added. The mixture was degassed by three freeze-evacuate-thaw cycles and heated to 60° C. for 24 hours. The product was purified by precipitation with diethyl ether. (Product: 4.0 g) $^1$H NMR (500 MHz, CDCl$_3$): δ 7.71 (br), 5.37 (br), 3.96 (br), 3.26 (br), 1.83 (br), 0.79 (br) ppm. GPC(CHCl$_3$, poly(styrene) standards, M$_n$=34000, PDI=2.9)

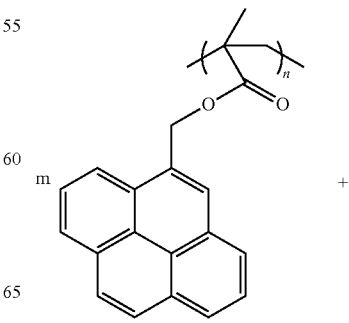

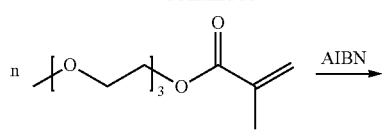

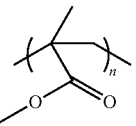
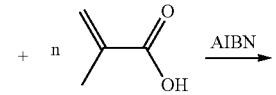

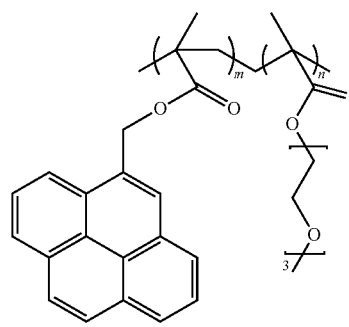
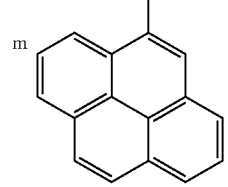

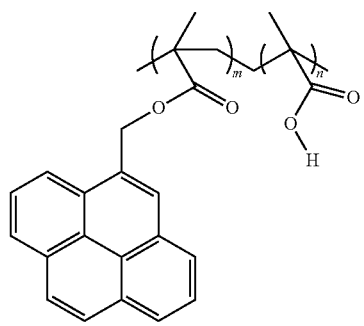

Synthesis of poly(9-anthrylmethyl methacrylate-co-methacrylic acid)

9-Anthrylmethyl methacrylate (5.0 g) and methacylic acid (0.54 g) were dissolved in freshly distilled THF (10 mL). To the solution 2,2'-azobis(2-methylpropionitrile) (AIBN) (20 mg) was added. The mixture was degassed by three freeze-evacuate-thaw cycles and heated to 60° C. for 24 hours. The product was purified by precipitation with diethyl ether. (Product: 4.6 g)

Figure 17:
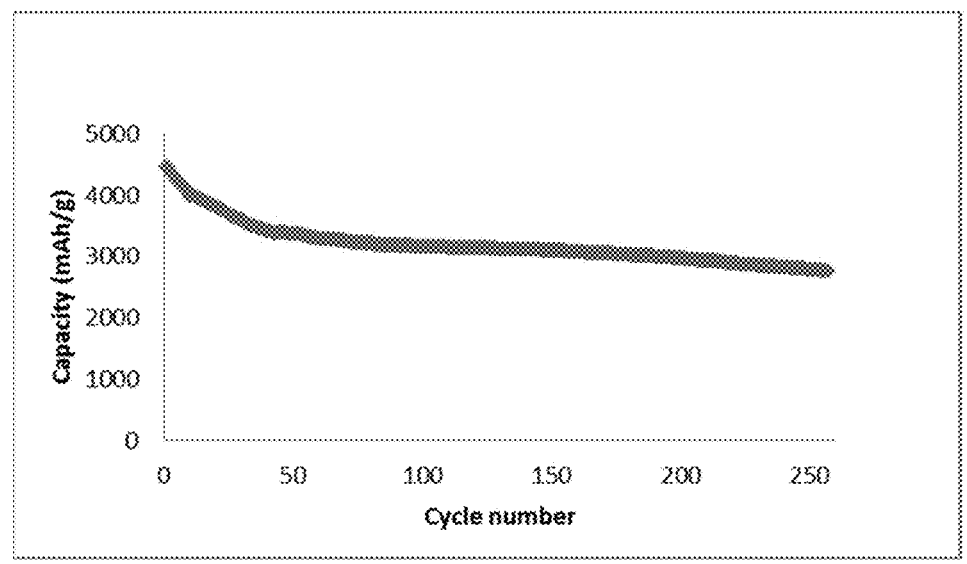
FIG. 17 illustrates electrode performance data for conductive polymer binder with Si nanoparticles.

Electrode Performance Data for Some of the Conductive Polymer Binder with the Si Nanoparticles FIG. 17 shows electrode performance data for conductive polymer binder:

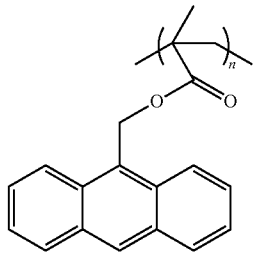

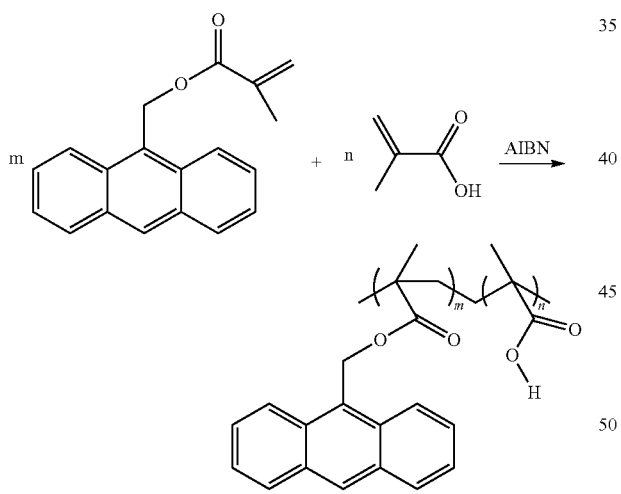

with Si nanoparticles. The electrode composition is polymer binder at 33% by weight, and Si nanoparticles at 67%. The electrode is in a coin cell with Li metal counter electrode. The cell is cycled between 0.01-1 V at C/10 rate.

Figure 18:
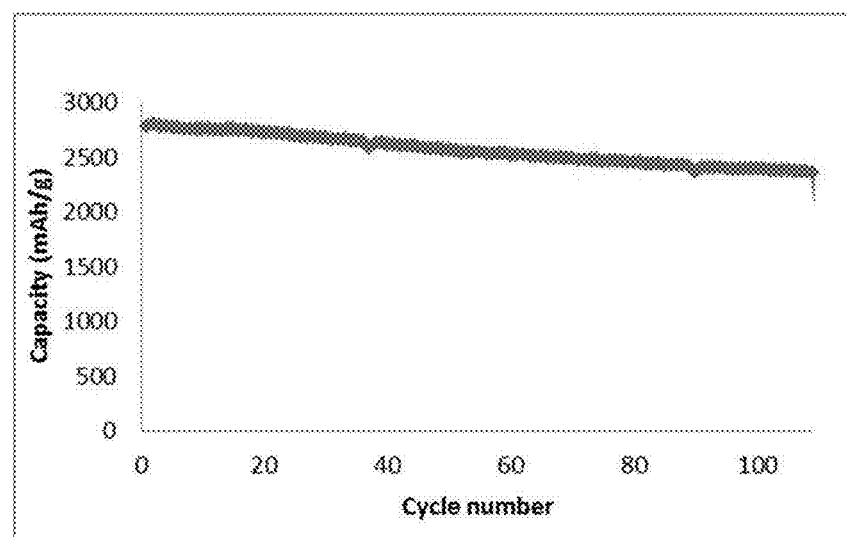
FIG. 18 illustrates electrode performance data for conductive polymer binder with Si nanoparticles.

FIG. 18 shows electrode performance data for conductive polymer binder:

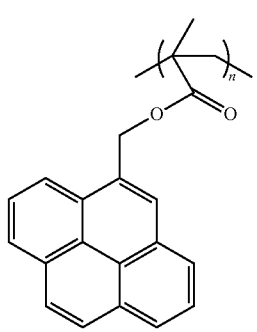

Synthesis of poly(1-pyrenemethyl methacrylate-co-methacrylic acid)

1-pyrenemethyl methacrylate (5.0 g) and methacylic acid (0.50 g) were dissolved in freshly distilled THF (20 mL). To the solution 2,2'-azobis(2-methylpropionitrile) (AIBN) (20 mg) was added. The mixture was degassed by three freeze-evacuate-thaw cycles and heated to 60° C. for 24 hours. The product was purified by precipitation with diethyl ether. (Product: 4.1 g) $^1$H NMR (500 MHz, DMSO-$d_6$): δ 12.7 (br), 7.68 (br), 5.48 (br), 1.06 (br) ppm.

with Si nanoparticles. The electrode composition is polymer binder at 33% by weight, and Si nanoparticles at 67%. The electrode is in a coin cell with Li metal counter electrode. The cell is cycled between 0.01-1 V at C/10 rate.

Figure 19:
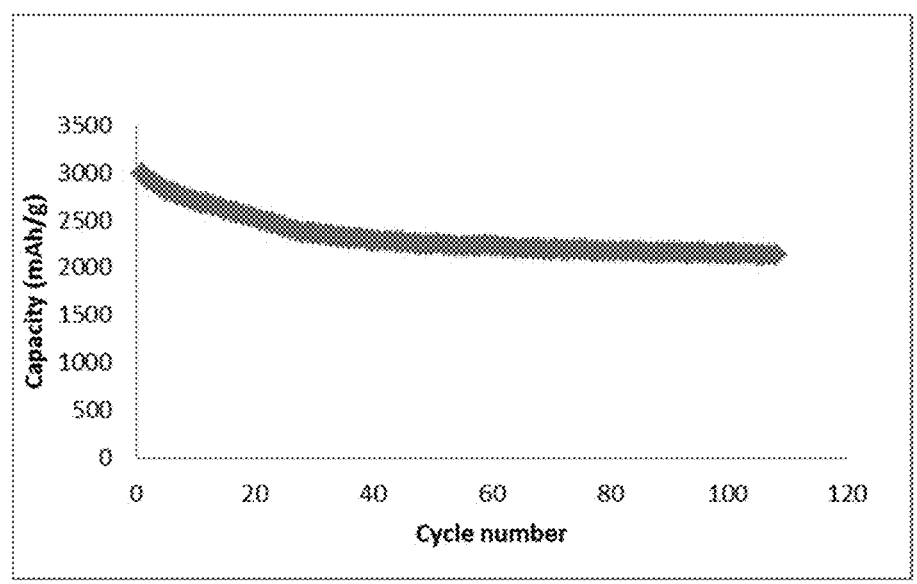
FIG. 19 illustrates electrode performance data for conductive polymer binder with Si nanoparticles.

FIG. 19 shows electrode performance data for conductive polymer binder:

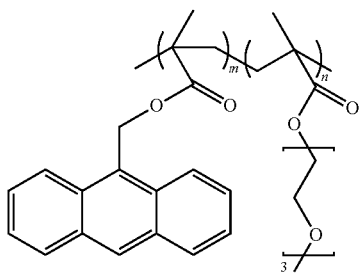

with Si nanoparticles. m/n ratio is 7/3. The electrode composition is polymer binder at 33% by weight, and Si nanoparticles at 67%. The electrode is in a coin cell with Li metal counter electrode. The cell is cycled between 0.01-1 V at C/10 rate.

Figure 20:
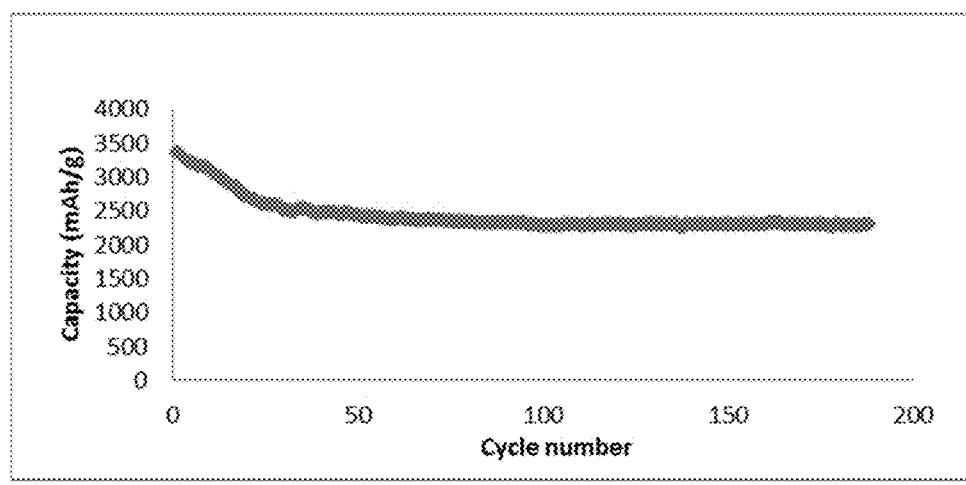
FIG. 20 illustrates electrode performance data for conductive polymer binder with Si nanoparticles.

FIG. 20 shows electrode performance data for conductive polymer binder:

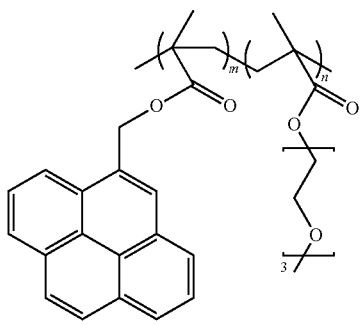

with Si nanoparticles. m/n ratio is 7/3. The electrode composition is polymer binder at 33% by weight, and Si nanoparticles at 67%. The electrode is in a coin cell with Li metal counter electrode. The cell is cycled between 0.01-1 V at C/10 rate.

Figure 21:
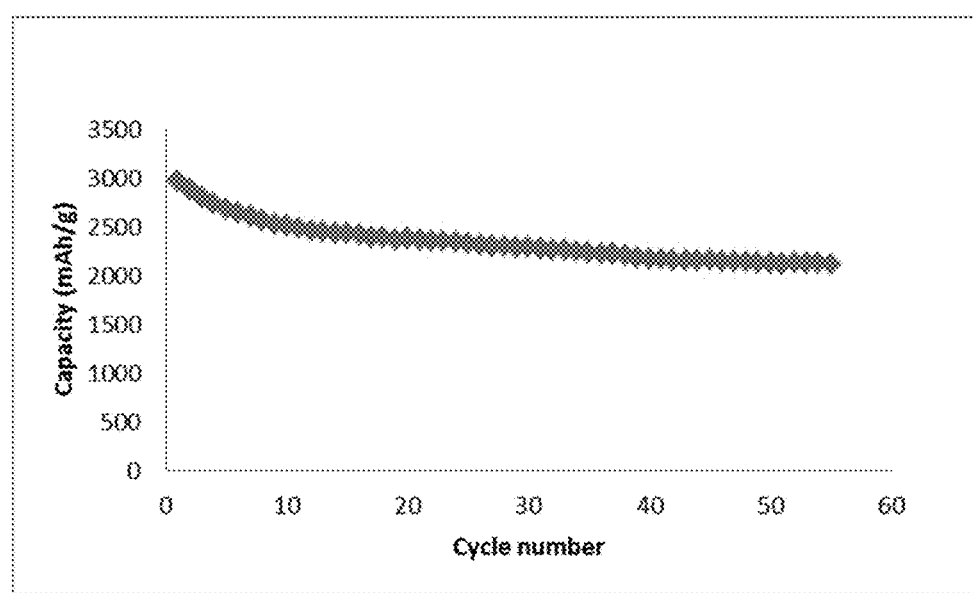
FIG. 21 illustrates electrode performance data for conductive polymer binder with Si nanoparticles.

FIG. 21 shows electrode performance data for conductive polymer binder:

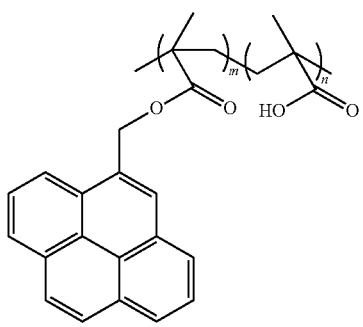

with Si nanoparticles. m/n ratio is 7/3. The electrode composition is polymer binder at 33% by weight, and Si nanoparticles at 67%. The electrode is in a coin cell with Li metal counter electrode. The cell is cycled between 0.01-1 V at C/10 rate.

What we claim is:

1. A polymeric composition with repeating units of the formula:

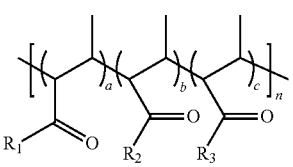

wherein: $R_1$ is selected from the group consisting of: naphthalene, anthracene, pyrene, fluorene, fluorenone and oligophenylene, $R_2$ is $(OCH_2CH_2)_m CH_3$ where m=0-1000, $R_3$ is selected from the group consisting of: H, OH, alkyloxide, alkanol, ethyleneoxide, carbonate and trialkylamine, a+b+c=1 wherein 0<a<1, 0<b<1, and 0<c<1, and n=1-10 million.

2. A method for making an electrode for use in a lithium ion battery comprising the steps of:
a) forming a solution of a solvent and a conductive polymer of the formula

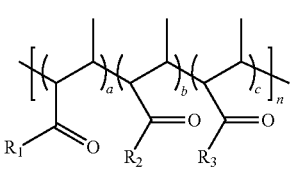

wherein: $R_1$ is selected from the group consisting of: naphthalene, anthracene, pyrene, fluorene, fluorenone and oligophenylene, $R_2$ is $(OCH_2CH_2)_m CH_3$ where m=0-1000, $R_3$ is selected from the group consisting of: H, OH, alkyloxide, alkanol, ethyleneoxide, carbonate and trialkylamine, a+b+c=1 wherein 0<a<1, 0<b<1, and 0<c<1, and n=1-10 million;
b) to this solution adding micro or nanoparticles of at least 1 element selected from the group consisting of: silicon, Sn, and graphite to form a slurry;
c) mixing the slurry to form a homogenous mixture;
d) depositing a thin film of said thus obtained mixture over top of a substrate;
e) drying the resulting composite to form said silicon electrode.

3. A lithium ion battery having a silicon electrode incorporating a conductive polymer binder having repeating units of the formula:

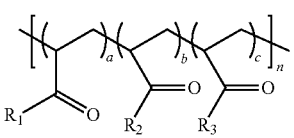

wherein: $R_1$ is selected from the group consisting of: naphthalene, anthracene, pyrene, fluorene, fluorenone and oligophenylene, $R_2$ is $(OCH_2CH_2)_m CH_3$ where m=0-1000, $R_3$ is selected from the group consisting of: H, OH, alkyloxide, alkanol, ethyleneoxide, carbonate and trialkylamine, a+b+c=1 wherein 0<a<1, 0<b<1, and 0<c<1, and n=1-10 million.

* * * * *